US012687998B2

(12) United States Patent
Lee et al.

(10) Patent No.: US 12,687,998 B2
(45) Date of Patent: Jul. 21, 2026

(54) PORTABLE ELECTRONIC DEVICE WHICH PREVENTS USER-SENSITIVE CONTENT FROM BEING EXPOSED TO OTHERS THROUGH EXTERNAL DISPLAY DEVICE

(71) Applicant: SAMSUNG ELECTRONICS CO., LTD., Suwon-si (KR)

(72) Inventors: Bona Lee, Suwon-si (KR); Eunjung Huh, Suwon-si (KR); Seungyong Lee, Suwon-si (KR); Doosuk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/070,734

(22) Filed: Mar. 5, 2025

(65) Prior Publication Data

US 2025/0199746 A1 Jun. 19, 2025

Related U.S. Application Data

(63) Continuation of application No. PCT/KR2023/004641, filed on Apr. 6, 2023.

(30) Foreign Application Priority Data

Nov. 7, 2022 (KR) ........................ 10-2022-0147232
Nov. 11, 2022 (KR) ........................ 10-2022-0150055

(51) Int. Cl.
G06F 3/14 (2006.01)
G06F 3/01 (2006.01)
G06F 21/62 (2013.01)
(52) U.S. Cl.
CPC ............ G06F 3/1454 (2013.01); G06F 3/015 (2013.01); G06F 21/6254 (2013.01)

(58) Field of Classification Search
CPC ..... G06F 3/1454; G06F 3/105; G06F 21/6254
See application file for complete search history.

(56) References Cited

U.S. PATENT DOCUMENTS

2007/0243907 A1 10/2007 Jin et al.
2012/0081353 A1 4/2012 Yusupov et al.
(Continued)

FOREIGN PATENT DOCUMENTS

CN 114462654 A 5/2022
CN 114489549 A 5/2022
(Continued)

OTHER PUBLICATIONS

International Search Report (PCT/ISA/210) and Written Opinion (PCT/ISA/237) issued on Aug. 4, 2023 by the International Searching Authority in International Patent Application No. PCT/KR2023/004641.

(Continued)

*Primary Examiner* — Robert J Michaud
(74) *Attorney, Agent, or Firm* — Sughrue Mion, PLLC

(57) ABSTRACT

A portable electronic device includes: a wireless communication circuit; a display; at least one processor operatively connected to the wireless communication circuit and the display; and a memory connected to the at least one processor, where the memory is configured to store instructions that, when executed, cause the at least one processor to: connect to a first external electronic device through the wireless communication circuit; determine whether there is a viewer, other than a user of the portable electronic device, capable of watching a display of the first external electronic device in a vicinity of the portable electronic device through data communication with the first external electronic device or a second external electronic device using the wireless communication circuit; and blur image data corresponding (Continued)

to unspecified content that is not specified as a target for sharing with the viewer.

15 Claims, 14 Drawing Sheets

(56) References Cited

U.S. PATENT DOCUMENTS

| | | | |
|---|---|---|---|
| 2012/0117290 A1* | 5/2012 | Sirpal | G06F 1/1654 |
| | | | 710/110 |
| 2013/0148720 A1 | 6/2013 | Rabii | |
| 2014/0150009 A1 | 5/2014 | Sharma | |
| 2014/0250447 A1 | 9/2014 | Schink | |
| 2015/0177943 A1 | 6/2015 | Park et al. | |
| 2015/0302621 A1 | 10/2015 | Liu et al. | |
| 2015/0332439 A1 | 11/2015 | Zhang et al. | |
| 2016/0275833 A1 | 9/2016 | Forbes et al. | |
| 2016/0316264 A1 | 10/2016 | Seo et al. | |
| 2017/0195572 A1* | 7/2017 | Wexler | G06V 20/20 |
| 2020/0013373 A1 | 1/2020 | Sugaya | |
| 2020/0394086 A1 | 12/2020 | Lee | |
| 2021/0399911 A1* | 12/2021 | Jorasch | H04L 12/1818 |
| 2022/0167052 A1 | 5/2022 | Patel et al. | |
| 2025/0220108 A1* | 7/2025 | Majdali | A63F 13/75 |

FOREIGN PATENT DOCUMENTS

| | | | | |
|---|---|---|---|---|
| CN | 116266873 A | * | 6/2023 | H04N 21/4307 |
| JP | 2005-150796 A | | 6/2005 | |
| KR | 10-0744380 B1 | | 7/2007 | |
| KR | 10-1218294 B1 | | 1/2013 | |
| KR | 10-2014-0107425 A | | 9/2014 | |
| KR | 10-2210704 B1 | | 2/2021 | |
| KR | 10-2022-0031168 A | | 3/2022 | |

OTHER PUBLICATIONS

Communication dated Oct. 9, 2025 issued by the European Patent Office in European Patent Application No. 23888821.8.
Communication dated Jan. 20, 2026, issued by the European Patent Office in European Application No. 23888821.8.

* cited by examiner

Figure 2:
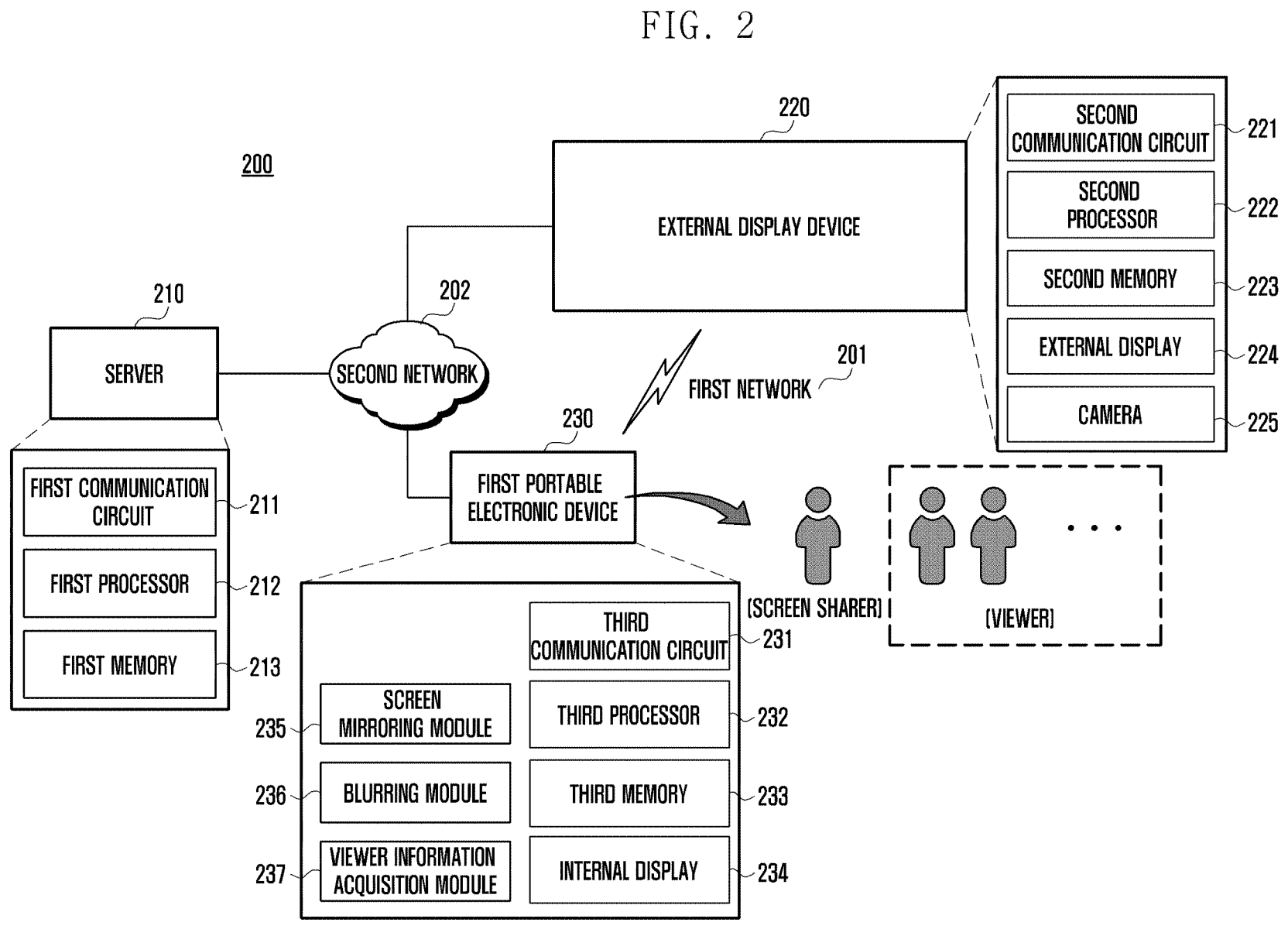

210 — SERVER
- 211 — FIRST COMMUNICATION CIRCUIT
- 212 — FIRST PROCESSOR
- 213 — FIRST MEMORY

202 — SECOND NETWORK

220 — EXTERNAL DISPLAY DEVICE
- 221 — SECOND COMMUNICATION CIRCUIT
- 222 — SECOND PROCESSOR
- 223 — SECOND MEMORY
- 224 — EXTERNAL DISPLAY
- 225 — CAMERA

201 — FIRST NETWORK (VIEWER)

(SCREEN SHARER)

230 — FIRST PORTABLE ELECTRONIC DEVICE
- 231 — THIRD COMMUNICATION CIRCUIT
- 232 — THIRD PROCESSOR
- 233 — THIRD MEMORY
- 234 — INTERNAL DISPLAY
- 235 — SCREEN MIRRORING MODULE
- 236 — BLURRING MODULE
- 237 — VIEWER INFORMATION ACQUISITION MODULE

400

600

FIG. 7A
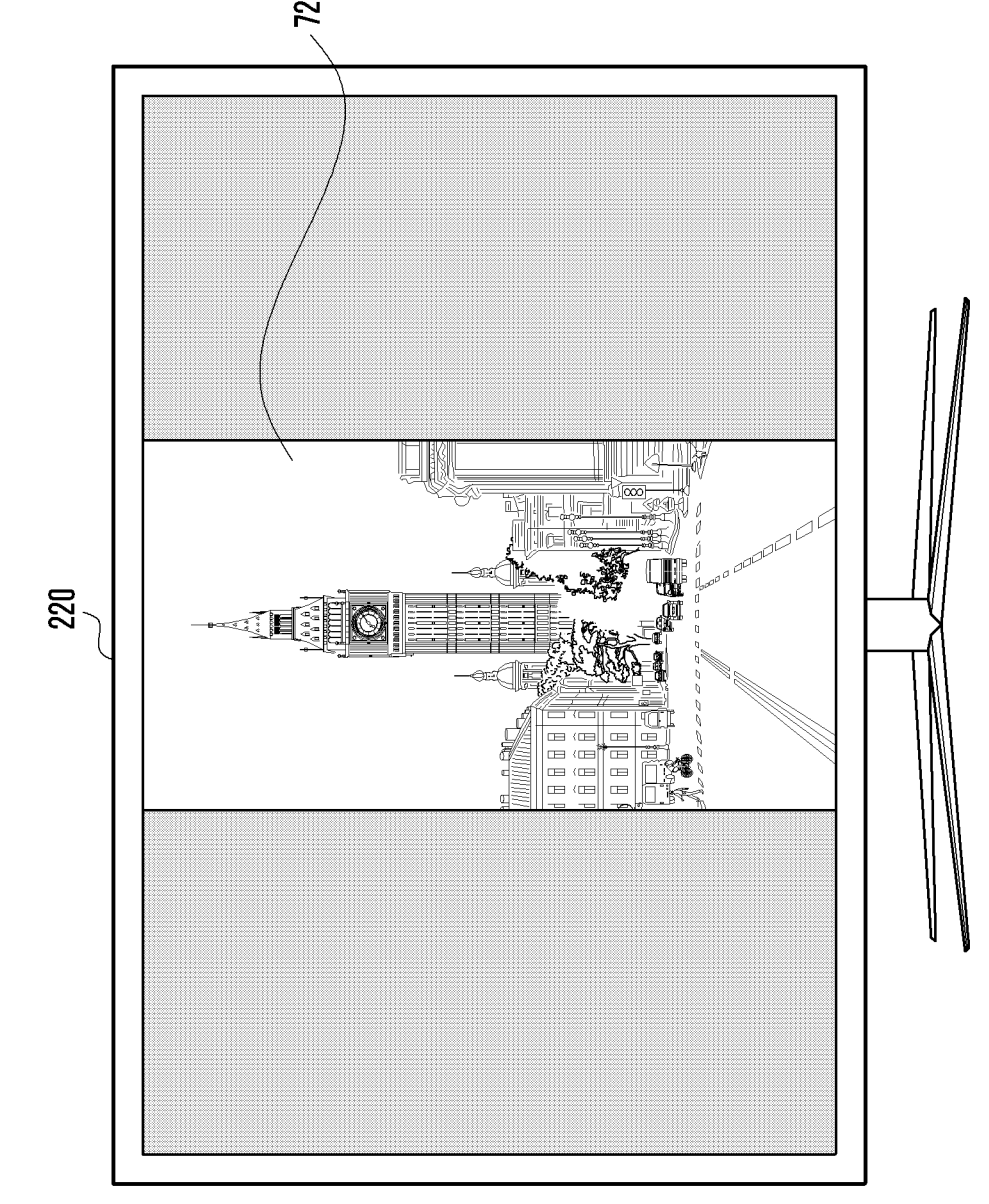
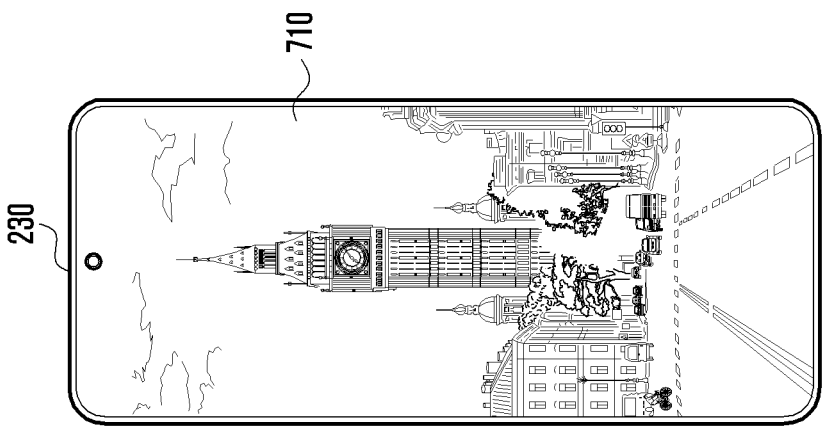

KIM SAM-SUNG
YOU HAVE A NEW MESSAGE

810

710

230

KIM SAM-SUNG
HEY, DO YOU WANT TO GO
PLAY GAMES THIS WEEKEND?

YOU HAVE A NEW MESSAGE

230

810

710

KIM SAM-SUNG

HEY, DO YOU WANT TO GO
PLAY GAMES THIS WEEKEND?

FIG. 11

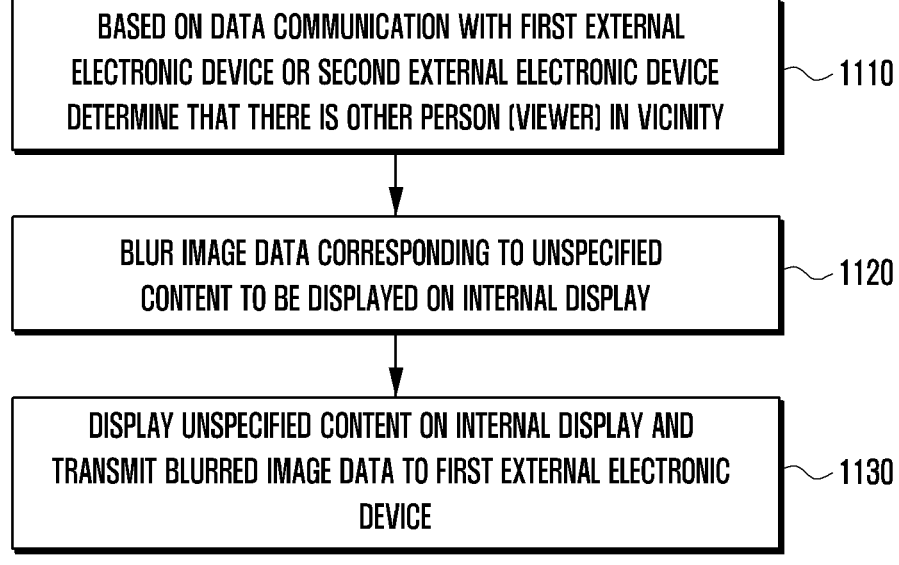

BASED ON DATA COMMUNICATION WITH FIRST EXTERNAL
ELECTRONIC DEVICE OR SECOND EXTERNAL ELECTRONIC DEVICE
DETERMINE THAT THERE IS OTHER PERSON (VIEWER) IN VICINITY — 1110

BLUR IMAGE DATA CORRESPONDING TO UNSPECIFIED
CONTENT TO BE DISPLAYED ON INTERNAL DISPLAY — 1120

DISPLAY UNSPECIFIED CONTENT ON INTERNAL DISPLAY AND
TRANSMIT BLURRED IMAGE DATA TO FIRST EXTERNAL ELECTRONIC
DEVICE — 1130

PORTABLE ELECTRONIC DEVICE WHICH PREVENTS USER-SENSITIVE CONTENT FROM BEING EXPOSED TO OTHERS THROUGH EXTERNAL DISPLAY DEVICE

CROSS-REFERENCE TO RELATED APPLICATIONS

This application is a continuation of International Application No. PCT/KR2023/004641, filed on Apr. 6, 2023, in the Korean Intellectual Property Receiving Office, which is based on and claims priority to Korean Patent Application No. 10-2022-0147232, filed on Nov. 7, 2022 and Korean Patent Application No. 10-2022-0150055, filed on Nov. 11, 2022, in the Korean Intellectual Property Office, the disclosures of which are incorporated by reference herein in their entireties.

BACKGROUND

1. Field

The disclosure relates to a method and device for allowing a person (people) to view visual information displayed on a portable electronic device through a display of another electronic device having a relatively large screen.

2. Description of Related Art

A user's portable electronic device (e.g., a smartphone) (hereinafter, the user device) may be wirelessly connected to an electronic device (e.g., a smart TV) (hereinafter, the external display device) having a large screen. The user device may mirror visual information (e.g., an image, a video) (hereinafter, screen mirroring) displayed on the display of the user device (hereinafter, the internal display) to an external display device. For example, the user device may encode image data corresponding to visual information displayed on the internal display and transmit the encoded image data to the external display device through the wireless communication circuit (e.g., a Wi-Fi communication circuit) of the user device. The external display device may decode the encoded image data received through the wireless communication circuit mounted on the external display device, convert the decoded image data into visual information, and display the same on the display. Through such screen mirroring, the same visual information may be displayed on the internal display and the external display device.

While screen mirroring is being performed, user-sensitive content may be exposed to others through an external display device.

SUMMARY

Provided is an electronic device that may protect content that may be sensitive to a user from being exposed to others other than content specified as a target to be shared with others through screen mirroring.

The technical task to be achieved in the disclosure is not limited to the technical task mentioned above. Additional aspects will be set forth in part in the description which follows and, in part, will be apparent from the description, or may be learned by practice of the presented embodiments.

According to an aspect of an embodiment, a portable electronic device may include: a wireless communication circuit; a display; memory comprising one or more storage media storing instructions; and at least one processor comprising processing circuitry, wherein the instructions, when executed by the at least one processor individually or collectively, cause the portable electronic device to: connect to a first external electronic device through the wireless communication circuit; determine whether there is a viewer, other than a user of the portable electronic device, capable of watching a display of the first external electronic device in a vicinity of the portable electronic device through data communication with the first external electronic device or a second external electronic device using the wireless communication circuit; blur image data corresponding to unspecified content that is not specified as a target for sharing with the viewer, based on determining that there is the viewer in the vicinity of the portable electronic device; display the unspecified content on the display of the portable electronic device; and transmit the blurred image data to the first external electronic device through the wireless communication circuit.

The instructions, when executed by the at least one processor individually or collectively, may cause the portable electronic device to display a user interface for adjusting a degree of blurriness of the unspecified content on the display of the portable electronic device with the unspecified content.

The instructions, when executed by the at least one processor individually or collectively, may cause the portable electronic device to: identify relationship information about a social relationship of a user of the portable electronic device in the memory; obtain viewer information based on the information about the social relationship and user identification information received from the second external electronic device; and determine a degree of blurriness of the unspecified content based on the viewer information, and where the obtained viewer information includes: a number of viewers; a gender of the viewers; and information about a relationship between the user and the viewers.

The instructions, when executed by the at least one processor individually or collectively, may cause the portable electronic device to configure the degree of blurriness of the unspecified content to a highest level based on the number of viewers being two or more according to the viewer information.

The instructions, when executed by the at least one processor individually or collectively, may cause the portable electronic device to configure the degree of blurriness of the unspecified content to the highest level based on the number of viewers being one and a gender of the viewer being different than a gender of the user according to the viewer information.

The instructions, when executed by the at least one processor individually or collectively, may cause the portable electronic device to: provide a first configuration menu for configuring the degree of blurriness of the unspecified content based on the relationship between the user and the viewers through the display of the portable electronic device; identify whether a first configuration value corresponding to the relationship through the first configuration menu is stored in the memory based on the number of viewers being one, and the gender of the viewer corresponding to the gender of the user; and based on the first configuration value being stored in the memory, configure the degree of blurriness of the unspecified content based on the first configuration value.

The instructions, when executed by the at least one processor individually or collectively, may cause the portable electronic device to: obtain a heart rate as biometric information of the user; and configure the degree of blurriness of the unspecified content to a lowest level based on the number of viewers being one, the gender of the viewer corresponding to the gender of the user, the first configuration value corresponding to the relationship not being stored in the memory, and the heart rate being below a threshold.

The instructions, when executed by the at least one processor individually or collectively, may cause the portable electronic device to: provide a second configuration menu for configuring the degree of blurriness of the unspecified content through the display of the portable electronic device; identify whether a second configuration value specified for the unspecified content is stored in the memory through the second configuration menu based on the number of viewers being one, the gender of the viewer corresponding to the gender of the user, the first configuration value corresponding to the relationship not being stored in the memory, and the heart rate exceeding the threshold; and based on the second configuration value being stored in the memory, configure the degree of blurriness of the unspecified content based on the second configuration value.

The instructions, when executed by the at least one processor individually or collectively, may cause the portable electronic device to: identify relationship information about a social relationship of a user of the portable electronic device in the memory; obtain viewer information based on the information about the social relationship and image data received from the first external electronic device; and determine a degree of blurriness of the unspecified content based on the viewer information, and where the obtained viewer information includes: a number of viewers; a gender of the viewers; and information about a relationship between the user and the viewers.

The wireless communication circuit may include a Bluetooth communication circuit and a Wi-Fi communication circuit, wherein the instructions, when executed by the at least one processor individually or collectively, may cause the portable electronic device to determine whether the viewer is in the vicinity of the portable electronic device based on identification information received from the second external electronic device through the Bluetooth communication circuit or the Wi-Fi communication circuit.

The wireless communication circuit may include a UWB communication circuit, a Bluetooth communication circuit, and a Wi-Fi communication circuit, wherein the instructions, when executed by the at least one processor individually or collectively, may cause the portable electronic device to: obtain first location information of the portable electronic device based on a positioning communication with anchors through the UWB communication circuit; receive second location information of the second external electronic device from the second external electronic device through the Bluetooth communication circuit or the Wi-Fi communication circuit; and determine whether the viewer is in the vicinity of the portable electronic device based on the first location information and the second location information.

The wireless communication circuit may include a UWB communication circuit, wherein the instructions, when executed by the at least one processor individually or collectively, may cause the portable electronic device to: obtain distance information based on a positioning communication with the second external electronic device through the UWB communication circuit; and determine whether the viewer is in the vicinity of the portable electronic device based on the distance information.

The instructions, when executed by the at least one processor individually or collectively, may cause the portable electronic device to: receive distance information from the first external electronic device; and determine whether the viewer is in the vicinity of the portable electronic device based on the distance information.

The instructions, when executed by the at least one processor individually or collectively, may cause the portable electronic device to: receive image data from the first external electronic device; and determine whether the viewer is in the vicinity of the portable electronic device based on the image data received from the first external electronic device.

According to an aspect of an embodiment, a method of operating a portable electronic device may include: connecting to a first external electronic device through a wireless communication circuit of the portable electronic device; determining whether there is a viewer, other than a user of the portable electronic device, capable of watching a display of the first external electronic device in a vicinity of the portable electronic device through data communication with the first external electronic device or a second external electronic device using the wireless communication circuit; blurring image data corresponding to unspecified content that is not specified as a target for sharing with the viewer, based on determining that there is the viewer in the vicinity of the portable electronic device; displaying the unspecified content on the display of the portable electronic device; and transmitting the blurred image data to the first external electronic device through the wireless communication circuit.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates a configuration of a screen mirroring system according to an embodiment;

FIG. 7A, FIG. 7B, and FIG. 7C illustrate examples of blurring unspecified content that is not specified as a sharing target according to an embodiment;

FIG. 8A and FIG. 8B illustrate examples of changing the format of a message reception notification so that sensitive content is not exposed in an externally received message according to an embodiment;

FIG. 11 is a flowchart illustrating operations for preventing content that may be sensitive to a user (a screen sharer) from being exposed to others (viewers) according to an embodiment.

DETAILED DESCRIPTION

Figure 1:
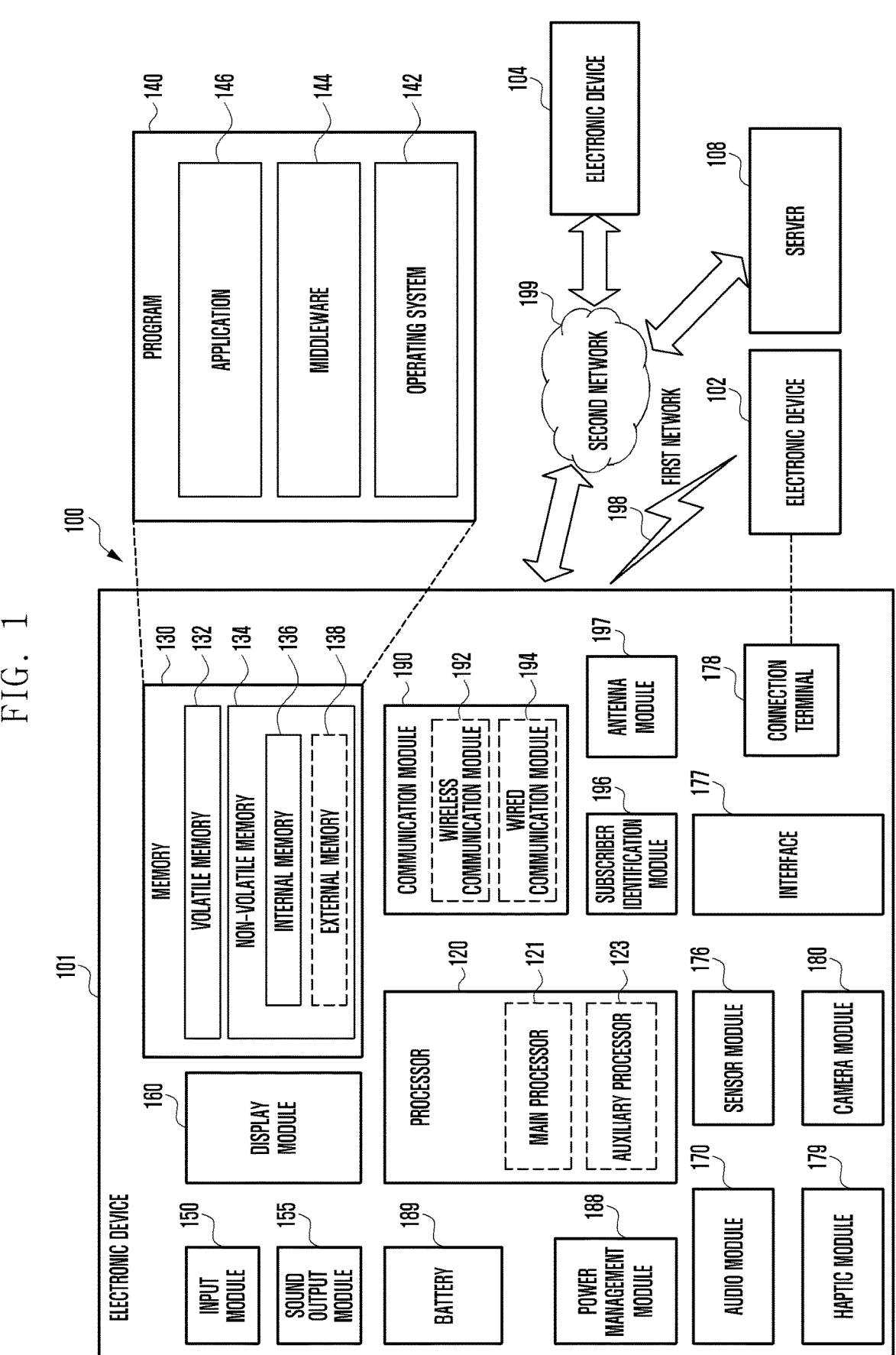
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 illustrates a configuration of a screen mirroring system 200 according to an embodiment.

Referring to FIG. 2, the screen mirroring system 200 may include a server 210, an external display device 220, and a first portable electronic device 230.

A first network 201 (e.g., the first network 198 of FIG. 1) may include a network for at least one short-range wireless communication among Bluetooth, Wi-Fi, Wi-Fi direct, Z-wave, Zig-bee, INSETEON, X10, or infrared data association (IrDA). In the screen mirroring system 200, the first portable electronic device 230 may transmit visual information (e.g., content specified to be shared with others (viewers) through screen mirroring) to the external display device 220 through the first network 201.

A second network 202 (e.g., the second network 199 of FIG. 1) may include a network for long-distance communication, such as the Internet or a computer network (e.g., LAN or WAN), and/or a cellular network. In the screen mirroring system 200, the devices 210, 220, and 230 may perform data communication through the second network 202.

The second network 202 may support a connection between Internet of Things (IoT) devices. In general, IoT may be defined as a system consisting of various objects (e.g., home appliances, medical devices, wearable devices, smartphones) that may be connected to each other through the Internet, or a network for connecting objects. In the disclosure, "IoT device" may be defined as an electronic device with built-in hardware and software for the purpose of connecting to other IoT devices through the Internet of Things and exchanging data with other IoT devices and/or for the purpose of controlling other IoT devices. In the disclosure, "IoT device group" may be defined as IoT devices connected through the first network 201 and/or the second network 202. An electronic device (e.g., the external display device 220) fixedly disposed in a specified place (e.g., home, office) may be registered as a member of the IoT device group (e.g., identification information of the device is stored in the server 210). A portable electronic device (e.g., the first portable electronic device 230) may be registered in the server 210 as a member of the IoT device group.

The server 210 may be configured to support connection between IoT devices registered in the IoT device group. As an embodiment, the server 210 may include a first communication circuit 211, a first memory 213, and a first processor 212. The first communication circuit 211, the first memory 213, and the first processor 212 may be configured substantially the same as the communication module 190, the memory 130, and the processor 120. The server 210 may be connected to the second network 202 through the first communication circuit 211. The server 210 may perform data communication with an IoT device (e.g., the first portable electronic device 230 and the external display device 220) through the second network 202. The server 210 may be connected to a node through the second network 202 and may perform data communication with the IoT device through the node. In the disclosure, "node" may be defined as a device that relays data between the server 210 and the IoT device and/or between the IoT devices. The node may be wirelessly connected to the IoT device through a short-range communication network (e.g., the first network 201). The node may be connected to the second network 202 by wire. For example, an access point that relays data using Wi-Fi communication may correspond to a node defined in the disclosure.

In the server 210, the first processor 212 may include a at least one processor capable of executing an instruction stored in the first memory 213 and outputting the executed result. For example, the first processor 212 may be composed of a combination of one or more of a general-purpose processor such as a central processing unit (CPU), a digital signal processor (DSP), an application processor (AP), a communication processor (CP), a graphics-only processor such as a graphical processing unit (GPU), a vision processing unit (VPU), and an artificial intelligence-only processor such as a neural processing unit (NPU). The first processor 212 may monitor the operation state of the IoT device (e.g., home appliance) in the IoT device group through the first communication circuit 211 and provide the monitoring result to a user device (e.g., the first portable electronic device 230) through the first communication circuit 211. The user device may guide the monitoring result (e.g., washing completed) to the user through the display. The user device may remotely control the operation of the IoT device based on information indicating a configuration for the operation of the IoT device and/or the monitoring result. For example, the user device may transmit a control command to the corresponding IoT device through the server 210 or through direct communication. In the disclosure, "direct communication" may be defined as communication performed between IoT devices in the IoT device group without a relay of another device (e.g., the server 210, node). For example, the first portable electronic device 230 may directly communicate with the external display device 220 through the first network 201 or the second network 202.

The external display device 220 may be connected to the server 210 and the first portable electronic device 230. As an embodiment, the external display device 220 may include a second communication circuit 221, a second processor 222, a second memory 223, and an external display 224. The second communication circuit 221, the second processor 222, the second memory 223, and the external display 224 may be configured substantially the same as the communication module 190, the memory 130, the processor 120, and the display module 160. The external display device 220 may be connected to the second network 202 through the second communication circuit 221. The external display device 220 may perform data communication with an IoT device (e.g., the first portable electronic device 230) and the server 210 through the second network 202. The external display device 220 may be connected to the first network 201 through the second communication circuit 221. The external display device 220 may be connected to the first portable electronic device 230 through the first network 201. For example, the external display device 220 may establish a wireless communication channel for data communication between the two devices 220 and 230 through the first network 201. In the external display device 220, the second processor 222 may be configured with a combination of one or more of the general-purpose processor, the graphics-only processor, and the artificial intelligence-only processor described above.

The second processor 222 may execute a software module stored as instructions stored in the second memory 223. According to an embodiment, the second memory 223 may store a positioning or localization module configured to measure the location and/or distance of the portable electronic device and provide measurement information to another portable electronic device (e.g., the first portable electronic device 230) performing screen mirroring.

The first portable electronic device 230 may be connected to the server 210 and the external display device 220. As an embodiment, the first portable electronic device 230 may include a third communication circuit 231, a third processor 232, a third memory 233, an internal display 234, a screen mirroring module 235, a blurring module 236, and a viewer information acquisition module 237. The third communication circuit 231, the third processor 232, the third memory 233, and the internal display 234 may be configured substantially the same as the communication module 190, the memory 130, the processor 120, and the display module 160. The first portable electronic device 230 may be connected to the second network 202 through the third communication circuit 231. The first portable electronic device 230 may perform data communication with an IoT device (e.g., the external display device 220) and the server 210 through the second network 202. The first portable electronic device 230 may be connected to the first network 201 through the third communication circuit 231. The first portable electronic device 230 may be connected to the external display device 220 through the first network 201. The third processor 232 may be configured with a combination of one or more of the general-purpose processor, the graphics-only processor, and the artificial intelligence-only processor described above. At least one of the modules 235, 236, and 237 may be stored as instructions in the third memory 233 and executed by the third processor 232.

In the first portable electronic device 230, the screen mirroring module 235 may be configured to perform an operation of connecting the first portable electronic device 230 to the external display device 220 using the third communication circuit 231 (e.g., establishing a wireless communication channel between the two devices 210 and 220) and a screen mirroring operation of providing first image data corresponding to content (hereinafter, target content) specified to be shared to others to the external display device 220 through the first network 201. The external display device 220 may convert the first image data received from the first portable electronic device 230 through the first network 201 into first visual information to display the first image data on the display. By such screen mirroring, first visual information identical to the target content displayed on the first portable electronic device 230 may be displayed on the external display device 220. Hereinafter, in the disclosure, as a term for distinguishing people who view the external display device 220, a user carrying the first portable electronic device 230 performing a screen mirroring operation may be referred to as a "screen sharer (or provider)". Hereinafter, in the disclosure, another person who views target content provided by a screen sharer through screen mirroring together with the screen sharer may be referred to as a "viewer".

According to an embodiment, the blurring module 236 in the first portable electronic device 230 may be configured to blur second image data corresponding to content (hereinafter, referred to as unspecified content) that is not specified to be shared in addition to the target content while a screen mirroring operation is performed. In the disclosure, "blurring" may be defined as processing that prevents a viewer from visually clearly recognizing unspecified content. The first portable electronic device 230 may provide blurred second image data to the external display device 220 through the first network 201. The external display device 220 may convert the blurred second image data received from the first portable electronic device 230 through the first network 201 into second visual information to display the second visual information on the display. By such screen mirroring, second visual information that is difficult to identify while corresponding to unspecified content displayed on the first portable electronic device 230 may be displayed on the external display device 220.

According to an embodiment, in the first portable electronic device 230, the blurring module 236 may be configured to adjust a degree of blurriness of unspecified content to be displayed on the external display device 220 based on a specified condition. At least one of the number of viewers, the gender of the viewers, a relationship between the screen sharer and the viewers (e.g., friends, family, co-workers), and biometric information of the screen provider may be considered as the specified condition. The blurring module 236 may determine a degree of blurriness of unspecified content based on the specified condition and process the second image data to the determined degree of blurriness. The degree of blurriness may be divided into several levels. For example, but not limited thereto, the degree of blurriness may be distinguished from level 0 to level 3. If it is determined as level 0, the first portable electronic device 230 may deactivate blurring. That is, the first portable electronic device 230 may transmit the second image data to the external display device 220 without blurring. If it is determined as level 3, the blurring module 236 may blur the second image data to the specified highest level and transmit blurred second image data to the external display device 220. Alternatively, the blurring module 236 may be configured to transmit third image data (e.g., image data corresponding to white or black) to the external display device 220 instead of the second image data. Alternatively, the blurring module 236 may be configured to transmit a message requesting display of a specified image (e.g., white or black) to the external display device 220 instead of transmitting the second image data.

In an embodiment, the blurring module 236 may be configured to adjust the degree of blurriness of unspecified content to be displayed on the external display device 220 based on user input. For example, the blurring module 236 may display a user interface (e.g., a slide bar) that allows the user to adjust the degree of blurriness on the internal display 234 along with the unspecified content. The blurring module 236 may blur the second image data to the degree of blurriness configured through the user interface and transmit the blurred second image to the external display device 220.

According to an embodiment, the viewer information acquisition module 237 may be configured to obtain viewer information (e.g., the number of viewers, the gender of the viewers, and the relationship between the screen sharer and the viewers) used to determine the degree of blurriness and provide the viewer information to the blurring module 236. As an example, the viewer information acquisition module 237 may receive data used to obtain viewer information from an external electronic device (e.g., a viewer's portable electronic device, the external display device 220, and a positioning server) through the third communication circuit 231. The viewer information acquisition module 237 may generate viewer information using received data and provide the viewer information to the blurring module 236.

According to an embodiment, the third processor 232 may configure the internal display 234 as multiple windows, display target content specified as a sharing target in the first window among the multiple windows, and display unspecified content not specified as a sharing target in the second window. The third processor 232 may provide image data corresponding to the target content to the external display device 220 through the first network 201.

Figure 3:
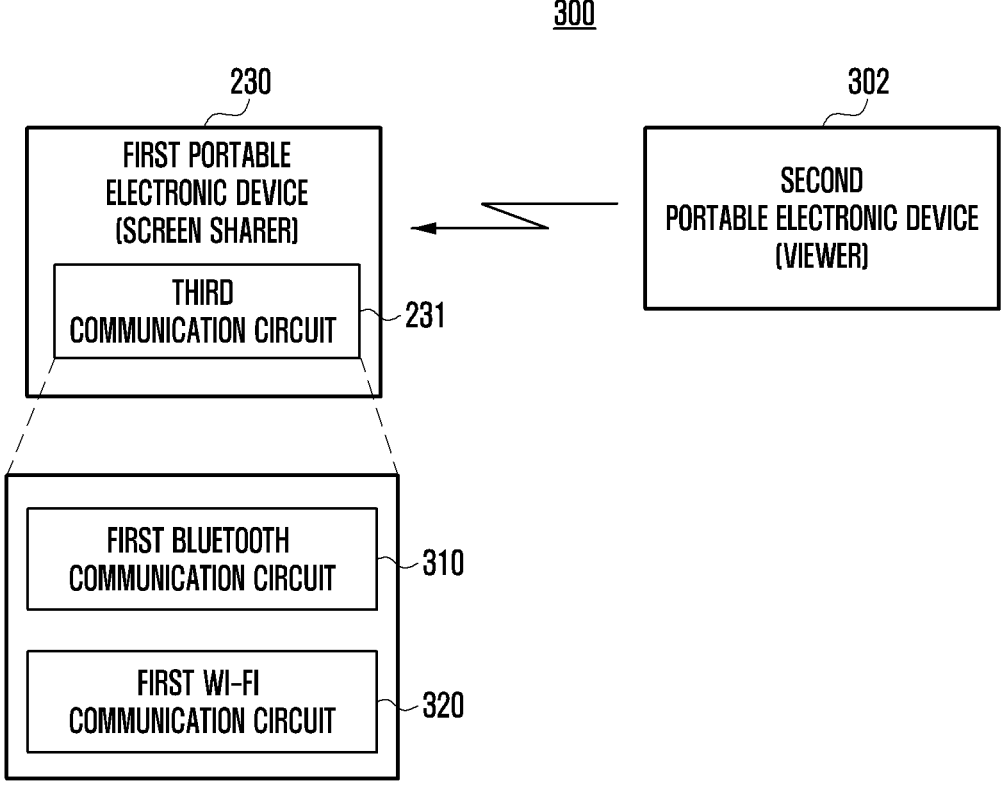
FIG. 3 illustrates a first system for obtaining viewer information according to an embodiment.

FIG. 3 illustrates a first system 300 for obtaining viewer information according to an embodiment. Referring to FIG. 3, the first system 300 may include the first portable electronic device 230 and a second portable electronic device 302. As the number of viewers increases further, three or more portable electronic devices may constitute the first system 300. In the first portable electronic device 230, the third communication circuit 231 is a short-range wireless communication circuit and may include, for example, a first Bluetooth communication circuit 310 and/or a first Wi-Fi communication circuit 320. The second portable electronic device 302 may also have a communication circuit substantially identical to the first Bluetooth communication circuit 310 and the first Wi-Fi communication circuit 320.

The first Bluetooth communication circuit 310 may establish a Bluetooth communication channel (or a session) corresponding to a frequency band specified to be used for Bluetooth (e.g., Bluetooth low energy (BLE)) communication among bands to be used for wireless communication with an external electronic device. The first Bluetooth communication circuit 310 may perform data communication with an external electronic device through the established Bluetooth communication channel. Upon transmission, the first Bluetooth communication circuit 310 may convert a baseband signal generated by the third processor 232 and received from the third processor 232 into an RF signal of a Bluetooth band (e.g., about 2.4 GHz) and transmit the converted RF signal to the outside through an antenna. Upon reception, the first Bluetooth communication circuit 310 may obtain an RF signal of the Bluetooth band through an antenna, and convert the obtained RF signal into a signal of a baseband (e.g., several MHz or less) to transmit the converted signal to the third processor 232.

The first Wi-Fi communication circuit 320 may establish a Wi-Fi communication channel (or a Wi-Fi session) corresponding to a frequency band specified to be used for Wi-Fi communication among bands to be used for wireless communication with an external electronic device. The Wi-Fi communication circuit 320 may perform Wi-Fi communication with an external electronic device through a Wi-Fi communication channel. Upon transmission, the Wi-Fi communication circuit 320 may convert a baseband signal generated by the third processor 232 and received from the third processor 232 into an RF signal of a Wi-Fi band and transmit the converted RF signal to the outside through an antenna. Upon reception, the Wi-Fi communication circuit 320 may receive an RF signal of a Wi-Fi band through an antenna, and convert the received RF signal into a baseband signal, and transmit the baseband signal to the third processor 232.

According to an embodiment, the third processor 232 may recognize the presence of an external electronic device in the vicinity of the first portable electronic device 230 by using a short-range wireless communication circuit. For example, the second portable electronic device 302 may periodically transmit a signal (e.g., an advertising signal or a broadcasting signal) to announce its presence. The third processor 232 may recognize the presence of the second portable electronic device 302 by receiving the signal through the first Bluetooth communication circuit 310 and/or the first Wi-Fi communication circuit 320. The third processor 232 may identify identification information from the received signal. The identification information may include, for example, information for identifying the corresponding device (e.g., information indicating the type of the corresponding device) and/or information for identifying the user who owns the corresponding device (e.g., a user account and a name). Based on the identified identification information, the third processor 232 may determine the number of viewers, a relationship between the screen sharer and the viewer (e.g., friends, co-workers, family), and the gender of the viewer. For example, the third processor 232 may recognize that the second portable electronic device 302 is a portable electronic device of the same type (e.g., a smartphone) as the first portable electronic device 230 based on the identified device identification information. The third processor 232 may determine the number of recognized portable electronic devices of the same type as the number of viewers. As another example, the third processor 232 may recognize that the owner of the second portable electronic device 302 is a person different from the screen sharer based on the identified user identification information. The third processor 232 may determine the number of recognized other people as the number of viewers. The third processor 232 may identify what kind of relationship (e.g., friends, company colleagues, and family) the owner (viewer) of the second portable electronic device 302 has with the screen sharer and whether the viewer is of the opposite gender with the screen sharer by using the user identification information received from the second portable electronic device 302 and information indicating the social relationship (e.g., personal information, contact information, and conversation content with other people) of the screen sharer. The third processor 232 may identify social relation information in the third memory 233. The social relationship information may include, for example, a contact information stored in the first portable electronic device 230 and personal information of the screen sharer (e.g., user account, name, face photo, gender, occupation). Additionally, the social relationship information may include conversations stored in the first portable electronic device 230 that the screen sharer shared with others through calls, text messages, instant messages (IMs), and social network services (SNSs). The third processor 232 may obtain information indicating the number of viewers, the gender of the viewers, and the relationship between the viewers and the screen sharer by using an artificial intelligence model. For example, the third processor 232 may input user identification information received from the second portable electronic device 302 and information indicating the social relationship of the screen sharer (e.g., personal information, contact information, and conversation with others) into the artificial intelligence model as input values, and obtain information indicating the number of viewers, the gender of the viewers, and the relationship between the viewers and the screen sharer from the result output from the artificial intelligence model.

According to an embodiment, the third processor 232 may determine a degree of blurriness of unspecified content to be displayed on the external display device 220 based on the number of viewers determined using the first Bluetooth communication circuit 310 and/or the first Wi-Fi communication circuit 320. For example, if the number of viewers is zero (i.e., when the screen sharer is watching the external display alone), the third processor 232 may deactivate the blurring. If the number of viewers is 1, the third processor 232 may blur the corresponding image data so that the unspecified content appears blurry. If the number of viewers is 2 or more, the third processor 232 may blur the image data so that unspecified content appears more blurred.

Figure 4:
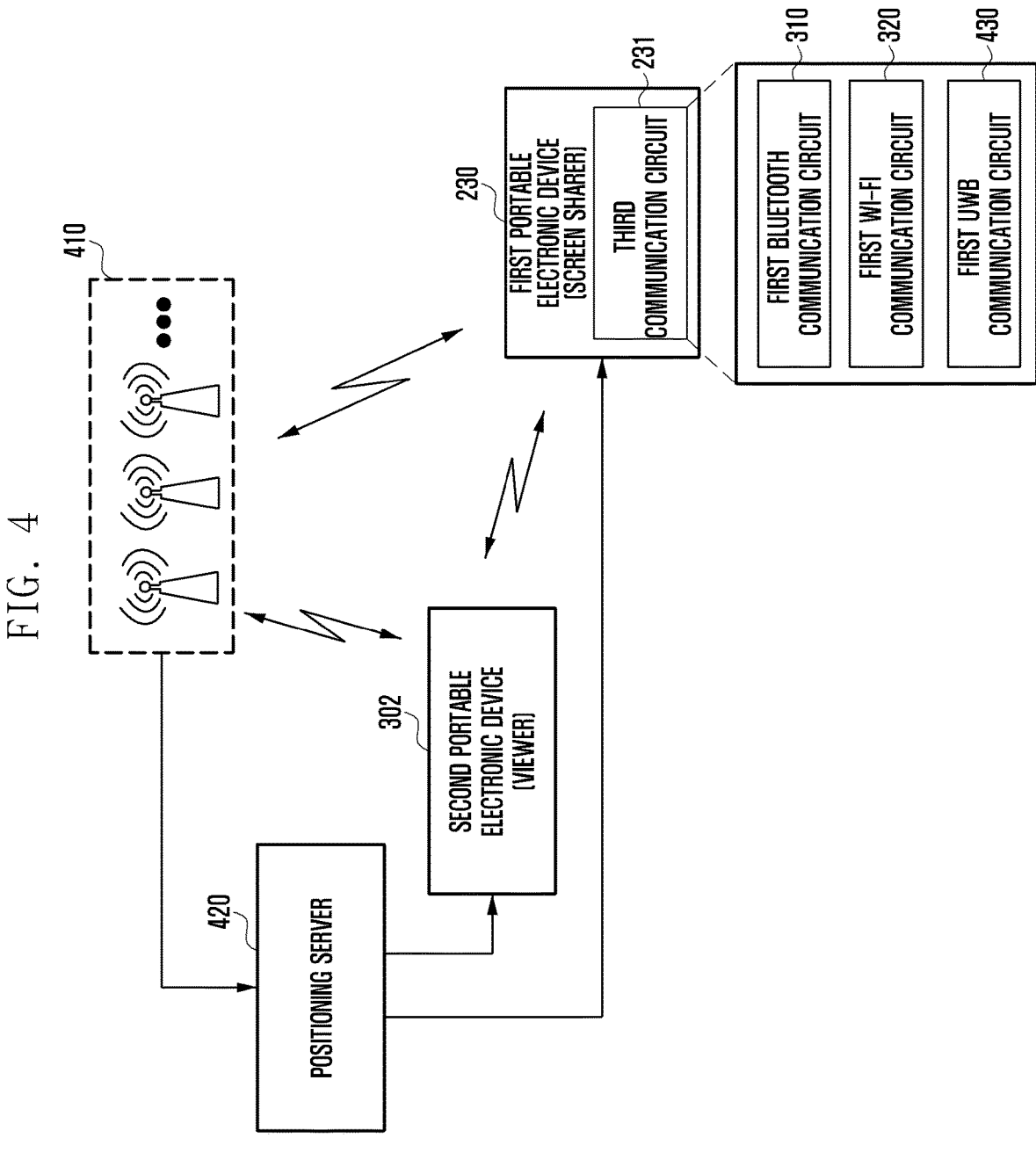
FIG. 4 illustrates a second system for obtaining viewer information according to an embodiment.

FIG. 4 illustrates a second system 400 for obtaining viewer information according to an embodiment. Referring to FIG. 4, the second system 400 may include the first portable electronic device 230, the second portable electronic device 302, anchors 410, and a positioning server 420. In the first portable electronic device 230, the third communication circuit 231 is a short-range wireless communication circuit, and may include, for example, the first Bluetooth communication circuit 310, the first Wi-Fi communication circuit 320, and a first ultra-wideband (UWB) communication circuit 430. The second portable electronic device 302 may also have substantially the same communication circuit as the first Bluetooth communication circuit 310, the first Wi-Fi communication circuit 320, and the first UWB communication circuit 430.

The first UWB communication circuit 430 may establish a UWB communication channel (or a UWB session) corresponding to a frequency band (e.g., about 3.1 to 10.6 GHz) specified to be used for UWB communication among bands to be used for wireless communication with an external electronic device (e.g., the second portable electronic device 302 and anchors 410). For example, the first UWB communication circuit 430 may establish a UWB communication channel (in other words, a UWB session) and perform UWB communication through the configured session. The first UWB communication circuit 430 may perform UWB communication with an external electronic device through a UWB communication channel. Upon transmission, the first UWB communication circuit 430 may convert a baseband signal generated by the third processor 232 and received from the third processor 232 into an RF signal of the UWB band and transmit the RF signal to the outside through an antenna. Upon reception, the first UWB communication circuit 430 may obtain an RF signal of the UWB band through an antenna, and convert the obtained RF signal into a baseband signal, and transmit the baseband signal to the third processor 232. A plurality of antennas may be used for UWB communication. For example, the UWB antenna may include a first antenna for RF signal transmission/reception and a second antenna dedicated to RF signal reception.

A portable electronic device (e.g., the first portable electronic device 230 and the second portable electronic device 302) may perform UWB communication (or UWB ranging) with anchors 410 supporting positioning. A downlink time difference of arrival (TDoA) or uplink TDoA method may be used to obtain location information of the portable electronic device.

In the case of the uplink TDoA method, the third processor 232 in the first portable electronic device 230 may transmit UWB signals to the anchors 410 by using the first UWB communication circuit 430. Each of the anchors 410 may transmit time information (e.g., timestamp) of the received UWB signal to the positioning server 420 (e.g., the server 210). The positioning server 420 may measure the location of the first portable electronic device 230 based on time information received from the anchors 410 and location information on each of the known anchors 410 and transmit location information (hereinafter, first location information) to the first portable electronic device 230. The second portable electronic device 302 may also obtain its own location information (hereinafter, referred to as second location information) in the same manner as described above.

The second portable electronic device 302 may provide the second location information to the first portable electronic device 230 through a short-range wireless communication channel (e.g., a BLE communication channel or a Wi-Fi communication channel) established between the two 302 and 230. In the first portable electronic device 230, the third processor 232 may receive the second location information from the second portable electronic device 302 through the third communication circuit 231.

In the case of the downlink TDoA method, the anchors 410 may each transmit a UWB signal to the first portable electronic device 230. In the first portable electronic device 230, the third processor 232 may record time information on UWB signals received from anchors 410 through the first UWB communication circuit 430, and obtain first location information based on the recorded time information and location information on the known anchors 410. The second portable electronic device 302 may transmit the second location information to the first portable electronic device 230 through a short-range wireless communication channel established between the two 302 and 230. In the first portable electronic device 230, the third processor 232 may receive the second location information from the second portable electronic device 302 through the third communication circuit 231.

According to an embodiment, the third processor 232 may determine whether the user of the second portable electronic device 302 is a viewer based on the first location information and the second location information. As an example, the third processor 232 may measure the distance between the two devices 302 and 230 based on the first location information and the second location information, and determine the user of the second portable electronic device 302 as a viewer when the distance between the two is less than a specified reference value. When the distance between the two is greater than or equal to the reference value, the third processor 232 may exclude the user of the second portable electronic device 302 from the viewer. As another example, the third processor 232 may monitor a change in the distance between the two devices 302 and 230 based on the first location information and the second location information, and when the monitoring result illustrates that the distance is increasing, the user of the second portable electronic device 302 may be excluded from the viewer. When the monitoring result illustrates that the distance is decreasing, the third processor 232 may determine the user of the second portable electronic device 302 as a viewer.

According to an embodiment, the third processor 232 may determine whether the user of the second portable electronic device 302 is a viewer without the assistance of the anchors 410. The third processor 232 may establish a UWB communication channel with the second portable electronic device 302 by using the first UWB communication circuit 430. The third processor 232 may perform positioning communication with the second portable electronic device 302 through the established UWB communication channel to measure the distance between the two 230 and 302. When the distance between the two 230 and 302 is less than a specified reference value, the third processor 232 may determine the user of the second portable electronic device 302 as a viewer. When the distance between the two 230 and 302 is greater than or equal to the reference value, the third processor 232 may exclude the user of the second portable electronic device 302 from the viewer. As another example, the third processor 232 may periodically measure the distance between the two 230 and 302. The third processor 232 may monitor a change in the distance between the two devices 230 and 302, and may exclude the user of the second portable electronic device 302 from the viewer when the monitoring result illustrates that the distance is increasing. When the monitoring result illustrates that the distance is decreasing, the third processor 232 may determine the user of the second portable electronic device 302 as a viewer.

A method of measuring the distance between two devices through positioning communication may be classified into a single-sided (SS)-two-way ranging (TWR) and a double-sided (DS)-TWR.

As an example of the SS-TWR, the third processor 232 in the first portable electronic device 230 may transmit the positioning start message to the second portable electronic device 302 through the established UWB communication channel. The third processor 232 may receive a response message from the second portable electronic device 302 through the first UWB communication circuit 430. The response message may include time information (e.g., a time value) indicating a time taken for the second portable electronic device 302 to process (e.g., generate a response message) the positioning start message. The third processor 232 may calculate the distance between the two 302 and 230 based on the time at which the positioning start message is transmitted, the time at which the response message is received, and time information included in the response message. For example, the third processor 232 may calculate the time taken for the positioning start message to be transmitted from the first portable electronic device 230 and to reach the second portable electronic device 302 based on the time at which the positioning start message is transmitted, the time at which the response message is received, and time information, and may obtain the distance by multiplying the calculated time taken by the speed of light.

As an example of the DS-TWR, the third processor 232 may receive the positioning start message from the second portable electronic device 302 through the first UWB communication circuit 430. The third processor 232 may transmit the response message to the second portable electronic device 302 through the first UWB communication circuit 430. The third processor 232 may receive a final message of the positioning communication from the second portable electronic device 302 through the first UWB communication circuit 430. The final message may include time information (e.g., a time value) indicating the time taken for the second portable electronic device 302 to process the response message (e.g., generate the final message). The third processor 232 may calculate the distance between the two 302 and 230 based on the time at which the response message is transmitted, the time at which the final message is received, and time information. For example, the third processor 232 may calculate the time taken for the response message to be transmitted from the first portable electronic device 230 and to reach the second portable electronic device 302 based on the time at which the response message is transmitted, the time at which the final message is received, and time information, and may obtain the distance by multiplying the calculated time taken by the speed of light.

According to an embodiment, the third processor 232 may determine the degree of blurriness of unspecified content to be displayed on the external display device 220 based on the number of viewers determined through positioning communication using anchors 410 (or without the assistance of anchors 410). The degree of blurriness is as exemplified in FIG. 3, but is not limited thereto.

Figure 5:
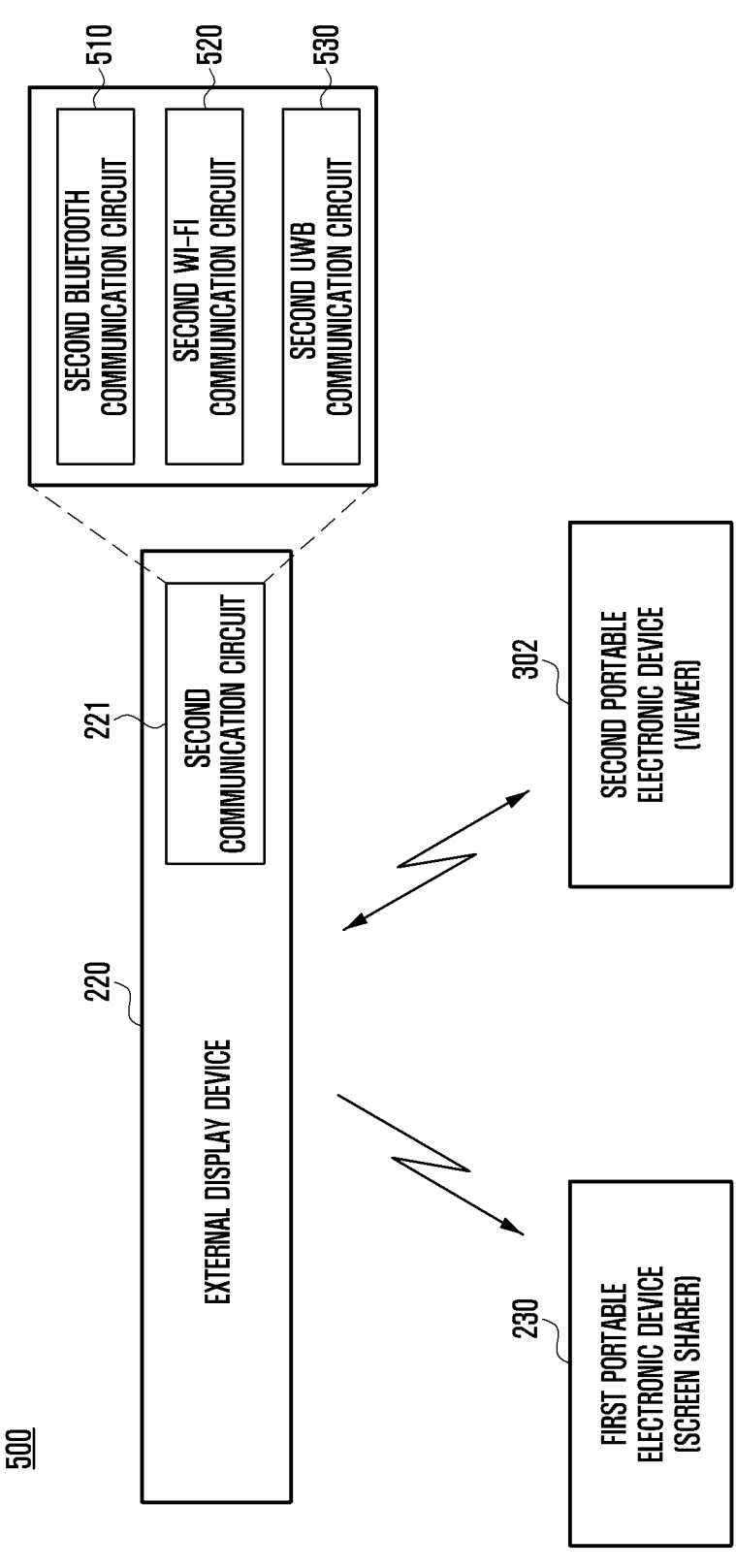
FIG. 5 illustrates a third system for obtaining viewer information according to an embodiment.

FIG. 5 illustrates a third system 500 for obtaining viewer information according to an embodiment. Referring to FIG. 5, the third system 500 may include the external display device 220, the first portable electronic device 230, and the second portable electronic device 302. In the external display device 220, the second communication circuit 221 may include a second Bluetooth communication circuit 510, a second Wi-Fi communication circuit 520, and a second UWB communication circuit 530. The second Bluetooth communication circuit 510, the second Wi-Fi communication circuit 520, and the second UWB communication circuit 530 may be configured substantially the same as the first Bluetooth communication circuit 310, the first Wi-Fi communication circuit 320, and the first UWB communication circuit 430.

According to an embodiment, in the external display device 220, the second processor 222 may establish a UWB communication channel with the second portable electronic device 302 by using the second UWB communication circuit 530. The second processor 222 may perform positioning communication with the second portable electronic device 302 through the established UWB communication channel to measure the distance between the two devices 220 and 302. The second processor 222 may provide information indicating the measured distance to the first portable electronic device 230 through a short-range wireless communication channel (e.g., a BLE communication channel or a Wi-Fi communication channel) established between the two 220 and 302. In the first portable electronic device 230, when the distance between the two 302 and 220 is less than a specified reference value, the third processor 232 may determine the user of the second portable electronic device 302 as a viewer. When the distance between the two 302 and 220 is greater than or equal to the reference value, the third processor 232 may exclude the user of the second portable electronic device 302 from the viewer. As another example, the third processor 232 may periodically receive distance information from the external display device 220. The third processor 232 may monitor a change in the distance between the two devices 302 and 220 based on periodically received distance information, and may exclude the user of the second portable electronic device 302 from the viewer when the monitoring result illustrates that the distance is increasing. When the monitoring result illustrates that the distance is decreasing, the third processor 232 may determine the user of the second portable electronic device 302 as a viewer. The SS-TWR or DS-TWR described above may be used for positioning communication between the external display device 220 and the second portable electronic device 302.

According to an embodiment, the third processor 232 may determine the degree of blurriness of unspecified content to be displayed on the external display device 220 based on the number of viewers determined by using the distance information received from the external display device 220. The degree of blurriness is as exemplified in FIG. 3, but is not limited thereto.

Figure 6:
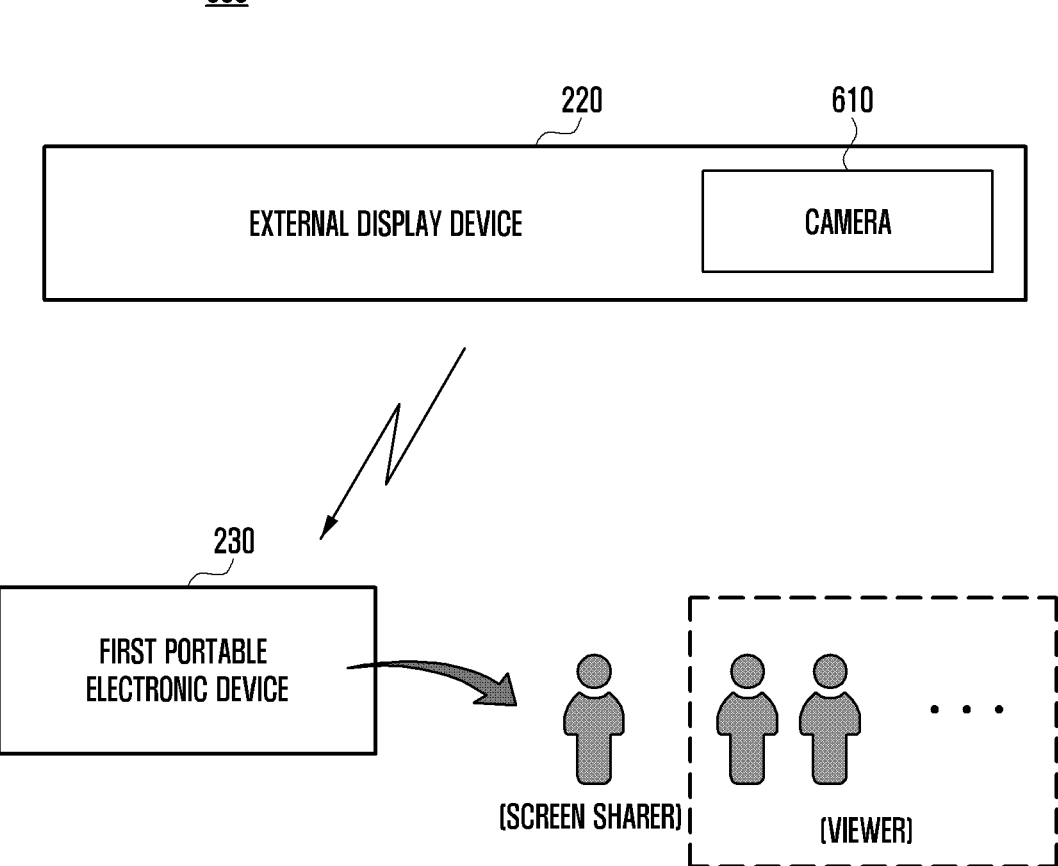
FIG. 6 illustrates a fourth system for obtaining viewer information according to an embodiment.

FIG. 6 illustrates a fourth system 600 for obtaining viewer information according to an embodiment. Referring to FIG. 6, the fourth system 600 may include the external display device 220 and the first portable electronic device 230. The external display device 220 may include a camera 610. The camera 610 may be configured substantially the same as the camera module 180 of FIG. 1. The lens of the camera 610 may be disposed to face the same direction as the screen of the external display 224 faces.

According to an embodiment, in the external display device 220, the second memory 223 may also store a module configured to provide image data generated by the camera 610 to the first portable electronic device 230 performing screen mirroring so that the first portable electronic device 230 may identify a viewer watching the external display 224. In the first portable electronic device 230, the third processor 232 may be configured to recognize subjects (e.g., people, phones, desks, etc.) from image data received from the external display device 220, and identify the number of other people (viewers) excluding the screen sharer among the identified subjects and the gender of the viewer. The third processor 232 may identify the number and gender of viewers by using an artificial intelligence model. For example, the machine-learned artificial intelligence model may be stored in the third memory 233 and executed by the third processor 232. The third processor 232 may input image data to the artificial intelligence model as an input value, and obtain information indicating the number and gender of viewers from the result value output from the artificial intelligence model. The processor 232 may identify the relationship between the recognized viewer and the screen sharer by using the artificial intelligence model. For example, the third processor 232 may input information (e.g., personal information, contact information, and conversation with others) indicating the social relationship of the screen sharer along with image data to the artificial intelligence model, and obtain information indicating the number of viewers, the gender of the viewers, and the relationship between the viewers and the screen sharer (e.g., friends, company colleagues, and family) from the result value output from the artificial intelligence model.

According to an embodiment, the second memory 223 may further store an image recognition module configured to recognize a subject photographed by the camera 225 in image data and provide information (e.g., the number of people and gender) on the recognized subject to the first portable electronic device 230 performing screen mirroring.

According to an embodiment, the third processor 232 may determine a degree of blurriness of unspecified content to be displayed on the external display device 220 based on the number of viewers identified. For example, if the number of viewers is zero (i.e., when the screen sharer is watching the external display alone), the third processor 232 may deactivate the blurring. If the number of viewers is 1, the third processor 232 may blur the corresponding image data so that the unspecified content appears blurry. If the number of viewers is 2 or more, the third processor 232 may blur the image data so that unspecified content appears more blurred.

According to an embodiment, the third processor 232 may configure the degree of blurriness to be low when the number of viewers is one but the viewer is of the same gender as the screen sharer and configure the degree of blurriness to be relatively high when the viewer is of the opposite gender.

At least some of the components of FIG. 2 may be omitted, or may be configured to further include components not illustrated. For example, identifying a viewer may be implemented through other components, and accordingly, the camera 225 may be omitted from the external display device 220. When the user's biometric information is included as the above-described condition, a wearable device (e.g., a smart watch) worn by a screen sharer, which is wirelessly connected to the first portable electronic device 230 and has a function of obtaining biometric information (e.g., heart rate) and providing the obtained biometric information to the first portable electronic device 230, may be included in the system 200 of FIG. 2.

In the above description, the prefixes "first", "second", "third", etc. are only for the classification of the same names and do not give any special meaning such as importance or order. In addition, "internal" and "external" above are also not given any special meaning.

Descriptions of screen mirroring, blurring, and obtaining viewer information are described in detail with reference to FIGS. 2 to 6, and therefore, the corresponding descriptions are briefly covered or omitted hereinafter.

Figure 7B:
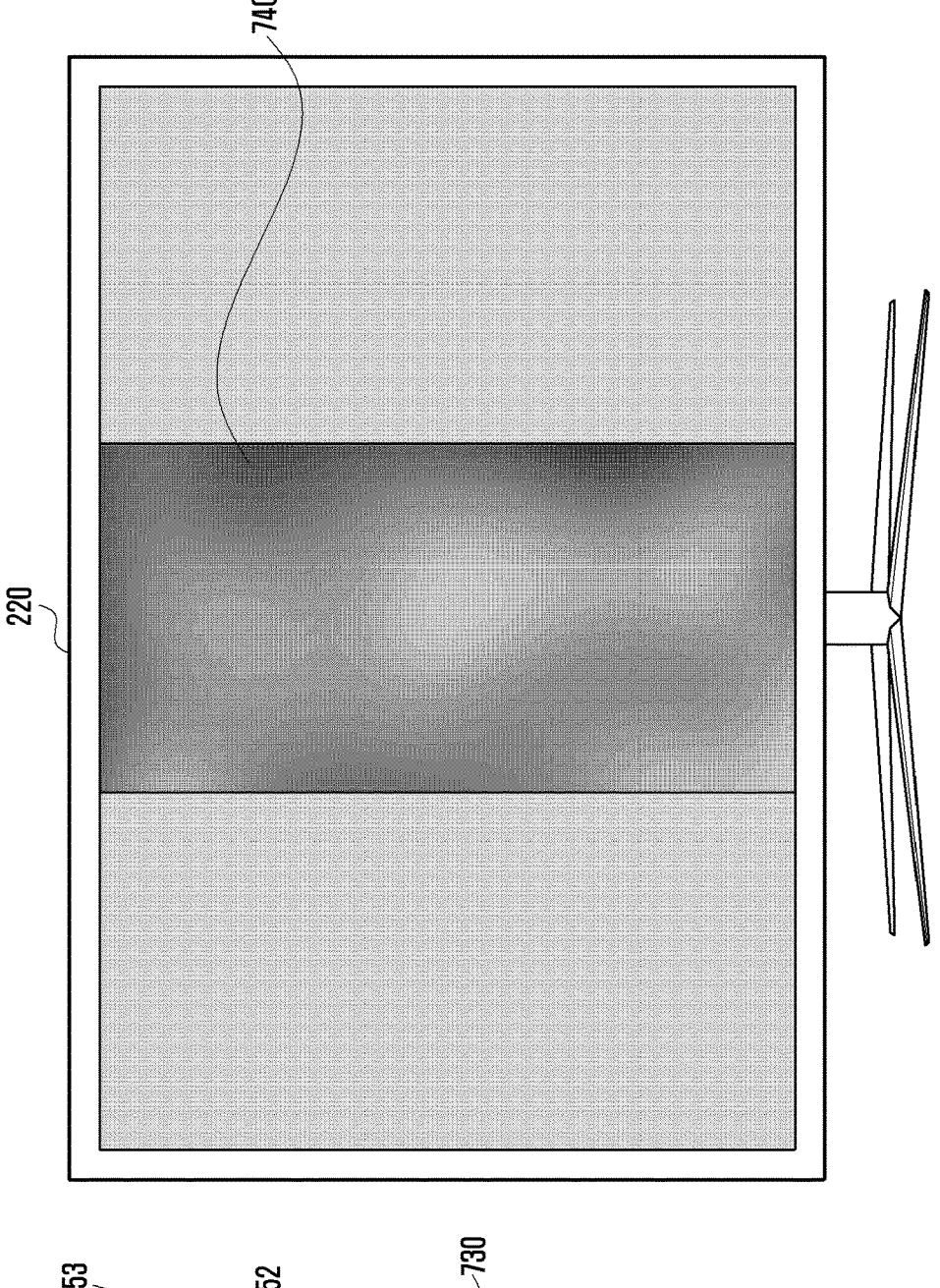
Figure 7C:
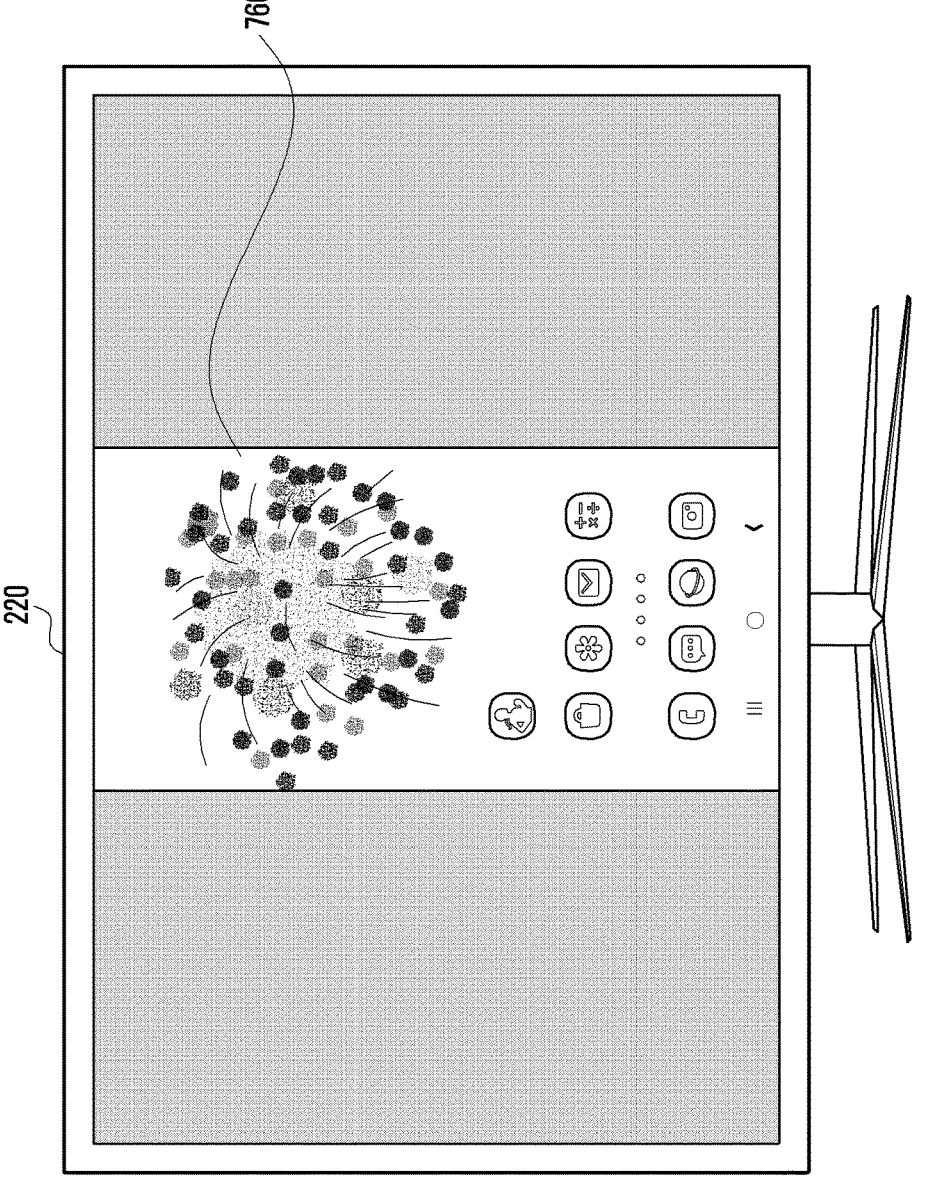

FIGS. 7A, 7B, and 7C illustrate examples of blurring unspecified content that is not specified as a sharing target.

Referring to FIG. 7A, in the first portable electronic device 230, the third processor 232 may display target content 710 specified as a sharing target and transmit image data corresponding to the target content 710 to the external display device 220 through the third communication circuit 231. The external display device 220 may convert the image data received from the first portable electronic device 230 into first content 720 and display the same on the display.

In the first portable electronic device 230, the third processor 232 may specify the content displayed on the first portable electronic device 230 as a sharing target while establishing a connection between the two devices 220 and 230 for screen mirroring. The third processor 232 may also specify content selected in advance as a sharing target through a configuration menu provided for interaction between the user and the first portable electronic device 230. The third processor 232 may also specify a type of content selected in advance as a sharing target through a configuration menu among various types of content (e.g., photos, documents, contacts, web pages, and home screens).

Referring to FIG. 7B, in the first portable electronic device 230, the third processor 232 may display unspecified content 730 that is not specified as a sharing target, determine the degree of blurriness of the unspecified content 730, and blur image data corresponding to the second content 730 with the determined degree of blurriness. The first portable electronic device 230 may transmit the blurred image data to the external display device 220 through the third communication circuit 231. The external display device 220 may convert the blurred image data received from the first portable electronic device 230 into the second content 740 and display the same on the display. At least one of the number of viewers, the gender of the viewers, the relationship between the screen sharer and the viewer, and the biometric information of the screen provider may be considered as the specified condition.

Referring to FIG. 7B again, in the first portable electronic device 230, the third processor 232 may display a pop-up window 750 on the display together with the second content 730 as a user interface that allows the user to adjust the degree of blurriness of the unspecified content 730. The third processor 232 may include a slide bar 751 and a button 752 for adjusting the degree of blurriness, and a check box 753 for maintaining the degree of blurriness of the corresponding content in a configured state in the pop-up window 750 to display the same on the display. The third processor 232 may change the location of the button 752 on the slide bar 751 in response to the user's touch input. The third processor 232 may blur the image data with a degree of blurriness corresponding to the location of the button 752.

Referring to FIG. 7C, in the first portable electronic device 230, the third processor 232 may configure the degree of blurriness of content based on a user input received through the pop-up window 750. For example, when the button 752 is located on the far left side of the slide bar 751, the third processor 232 may deactivate blurring for unspecified content 730 and transmit image data corresponding to unspecified content 730 to the external display device 220 through the third communication circuit 231. The external display device 220 may convert the image data received from the first portable electronic device 230 into the third content 760 and display the converted image data on the display.

Referring to FIG. 7C again, the third processor 232 may display the check box 753 in a checked state as illustrated in response to the user's first touch input to the check box 753, and store a configuration value indicating the current degree of blurriness of the unspecified content 730 in the third memory 233. When screen mirroring is performed on the unspecified content 730, the third processor 232 may identify whether the configuration value corresponding to the unspecified content 730 is stored in the third memory 233. When the corresponding configuration value is stored in the memory, the third processor 232 may blur image data corresponding to the unspecified content 730 based on the configuration value without considering the above-described specified condition.

In response to the user's second touch input to the check box 753, the third processor 232 may display the check box 753 in an unchecked state and delete the configuration value corresponding to the unspecified content 730 from the third memory 233. When screen mirroring is performed on the unspecified content 730, the third processor 232 may determine the degree of blurriness of the unspecified content 730 based on the above-described specified condition, and blur image data corresponding to the second content 730 with the determined degree of blurriness.

When the content is switched, the third processor 232 may display a pop-up window on the display together with the corresponding content, end the display of the pop-up window after a specified time elapses, and display only the corresponding content on the display. For example, when switching from the target content 710 to the unspecified content 730, the third processor 232 may display the pop-up window 750 corresponding to the unspecified content 730 together with the unspecified content 730. The third processor 232 may terminate the display of the pop-up window 750 after several seconds have elapsed as a specified time.

Figure 8A:
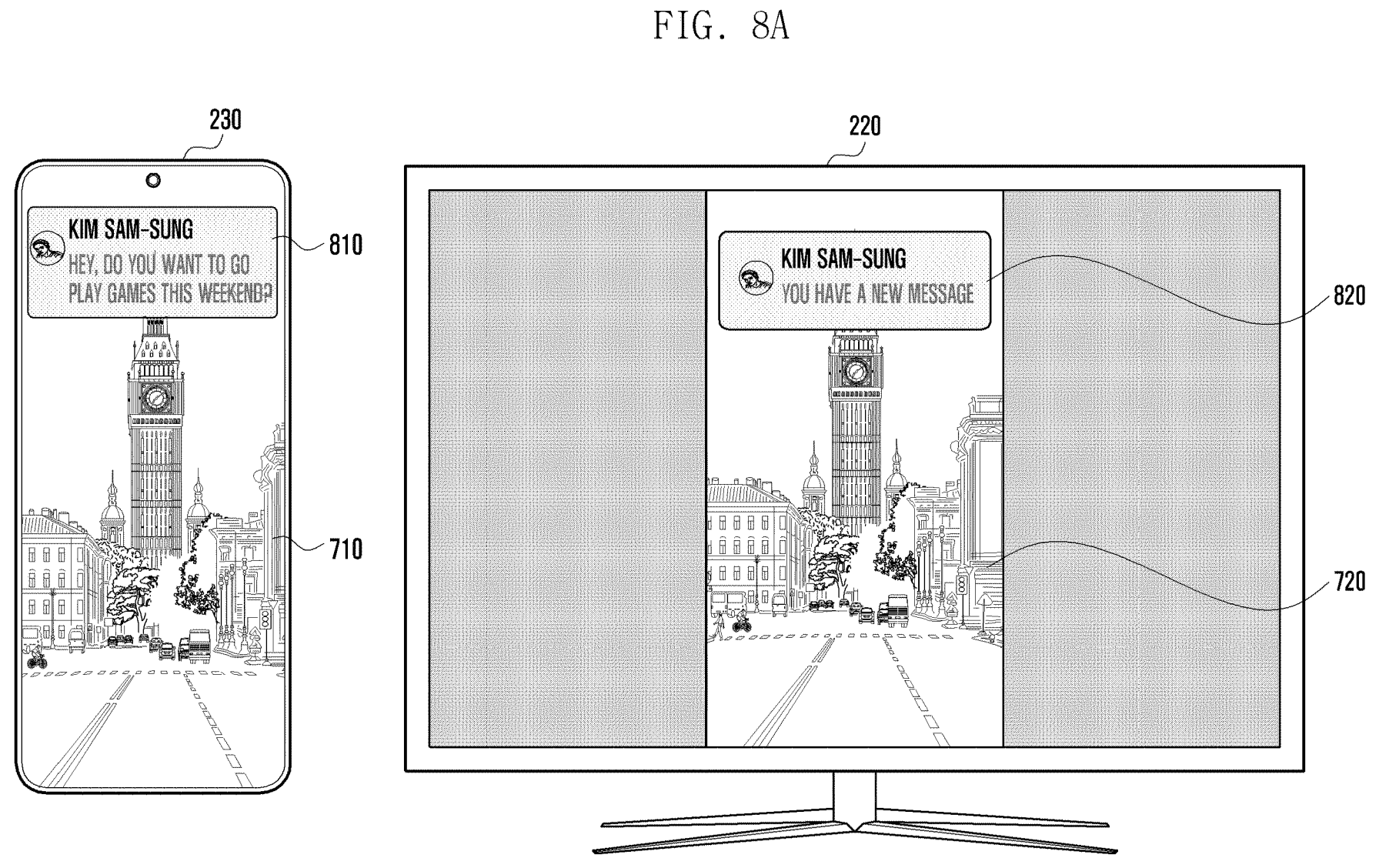
Figure 8B:
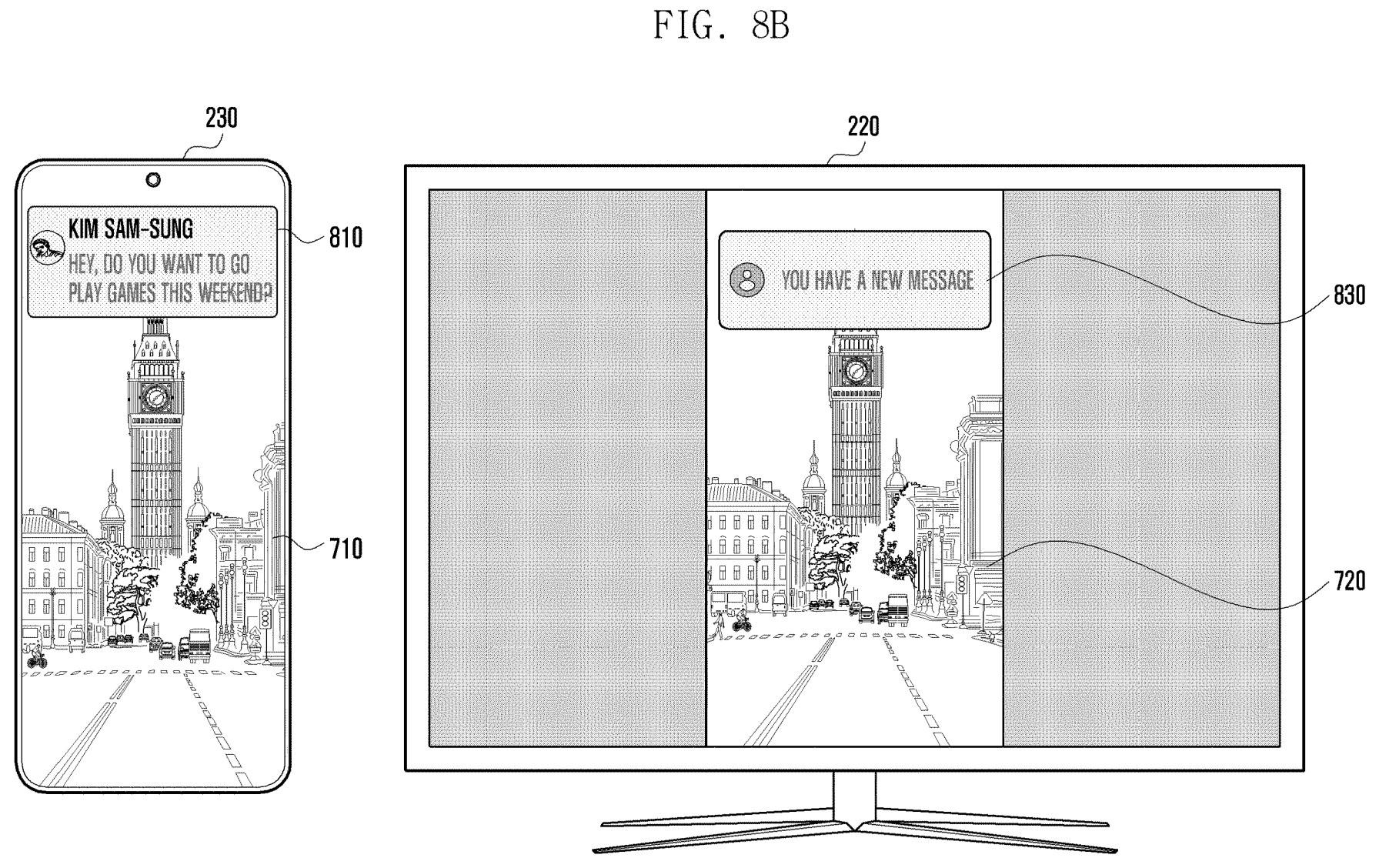

FIGS. 8A and 8B illustrate examples of changing the format of a message reception notification so that sensitive content is not exposed in an externally received message.

Referring to FIG. 8A, the target content 710 may be displayed on the first portable electronic device 230, and the first content 720 may be displayed on the external display device 220 at the same time. In this state, a message may be received from the outside to the first portable electronic device 230. In the first portable electronic device 230, the third processor 232 may configure and display a first pop-up window 810 so that a user (screen sharer) may identify the contents of the message and the sender of the message. For example, the third processor 232 may display at least a portion of the contents of the message, the name of the sender, and a thumbnail image indicating the sender included in the first pop-up window 810 on the display. The third processor 232 may configure a second pop-up window 820 with only information about the message sender so that the message content is not exposed to others (viewers) and transmit the image data corresponding thereto to the external display device 220 through the third communication circuit 231. The external display device 220 may convert the image data received from the first portable electronic device 230 into the second pop-up window 820 and display the converted image data on the display.

Referring to FIG. 8B, the third processor 232 may configure a third pop-up window 830 for notifying only that the message has been received so that the message sender is not exposed to others, and transmit the image data corresponding thereto to the external display device 220 through the third communication circuit 231. The external display device 220 may convert the image data received from the first portable electronic device 230 into the third pop-up window 830 and display the converted image data on the display.

The third processor 232 may determine information to be protected (not exposed) in the content based on the above-described specified condition. For example, if the number of viewers is zero (i.e., when the screen sharer is watching the external display alone), the third processor 232 may transmit image data corresponding to the first pop-up window 810 to the external display device 220. If the number of viewers is 1, the third processor 232 may transmit image data corresponding to the second pop-up window 820 to the external display device 220. If the number of viewers is 2 or more, the third processor 232 may transmit image data corresponding to the third pop-up window 830 to the external display device 220.

Figure 9:
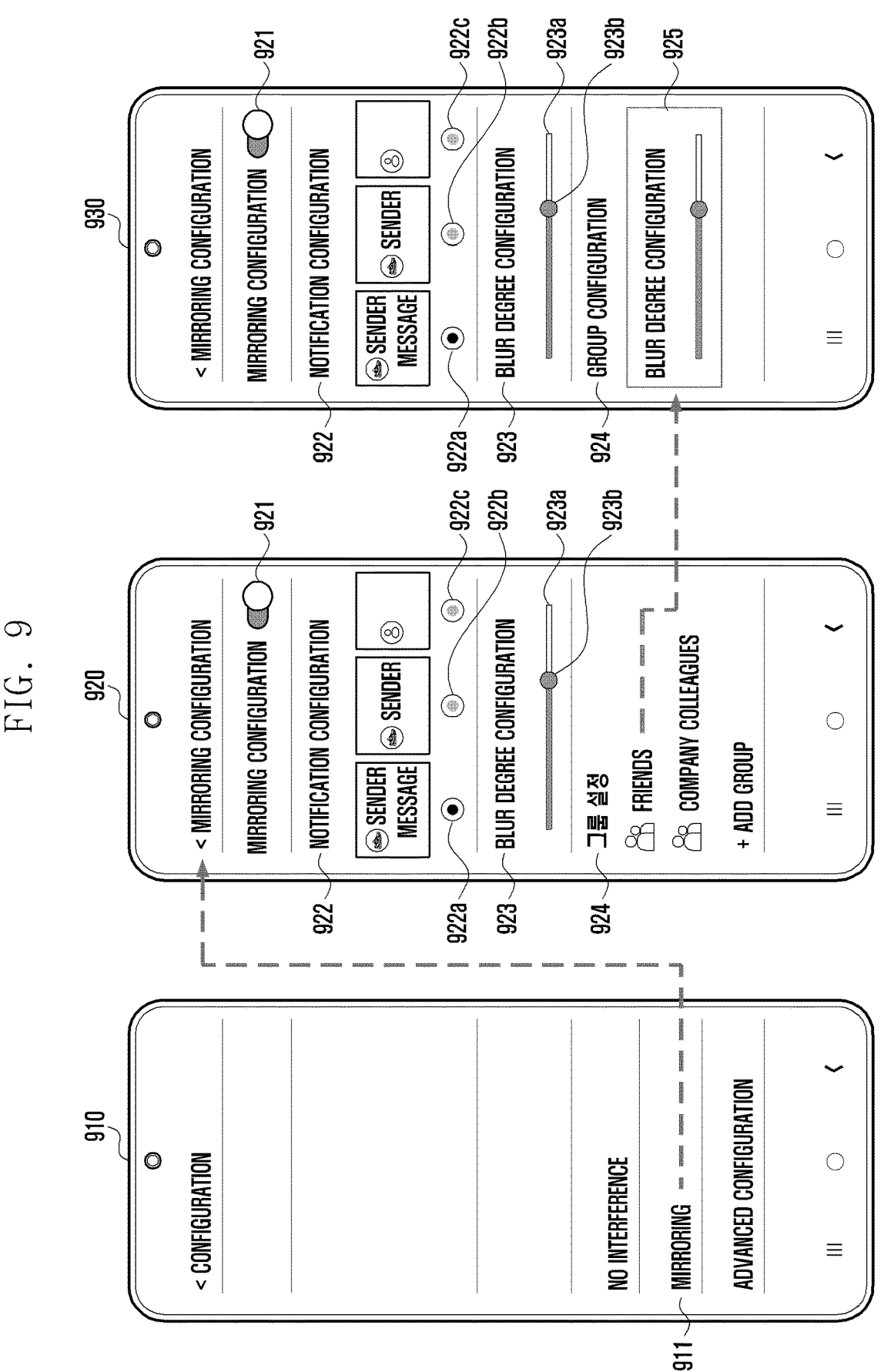
FIG. 9 illustrates an example of a configuration menu that allows a user to configure the degree of exposure of unspecified content that is not specified as a sharing target while screen mirroring is performed according to an embodiment.

FIG. 9 illustrates an example of a configuration menu that allows a user to configure the degree of exposure of unspecified content that is not specified as a sharing target while screen mirroring is performed.

Referring to FIG. 9, in the first portable electronic device 230, the third processor 232 may display a configuration menu 910 for configuring the operation of the first portable electronic device 230. For example, the third processor 232 may display the configuration menu 910 including a mirroring item 911 in response to a user's touch input to the configuration icon on the home screen. The third processor 232 may display a mirroring configuration menu 920 in response to the user's touch input to the mirroring item 911. For example, the third processor 232 may display the mirroring configuration menu 920 by including a first item 921 for selecting whether to apply the configuration value configured through the mirroring configuration menu 920 to unspecified content, a second item 922 for configuring the degree of exposure of notification information on the message received from outside, a third item 923 for configuring the degree of blurriness of unspecified content, and a fourth item 924 for configuring the degree of blurriness of unspecified content for each group classified according to the relationship between the screen sharer and the viewer.

When a first check box 922a is selected from the second item 922, the third processor 232 may configure the notification information as the first pop-up window 810. When a second check box 922b is selected from the second item 922, the third processor 232 may configure the notification information as the second pop-up window 820. When a third check box 922c is selected from the second item 922, the third processor 232 may configure the notification information as the third pop-up window 830.

The third processor 232 may configure the third item 923 with a slide bar 923a and a button 923b located on the slide bar 923a, and configure the degree of blurriness of unspecified content based on the location of the button 923b on the slide bar 923a.

When the corresponding group is a viewer, the third processor 232 may display a user interface (e.g., a slide bar) for configuring the degree of blurriness of unspecified content on the display by including the user interface in the pop-up window 925 in response to the user's touch input to a group selected from the fourth item 924, for example, friends or closed people identified through conversations in a call, text message, instant message (IM), and social network service (SNS).

Figure 10:
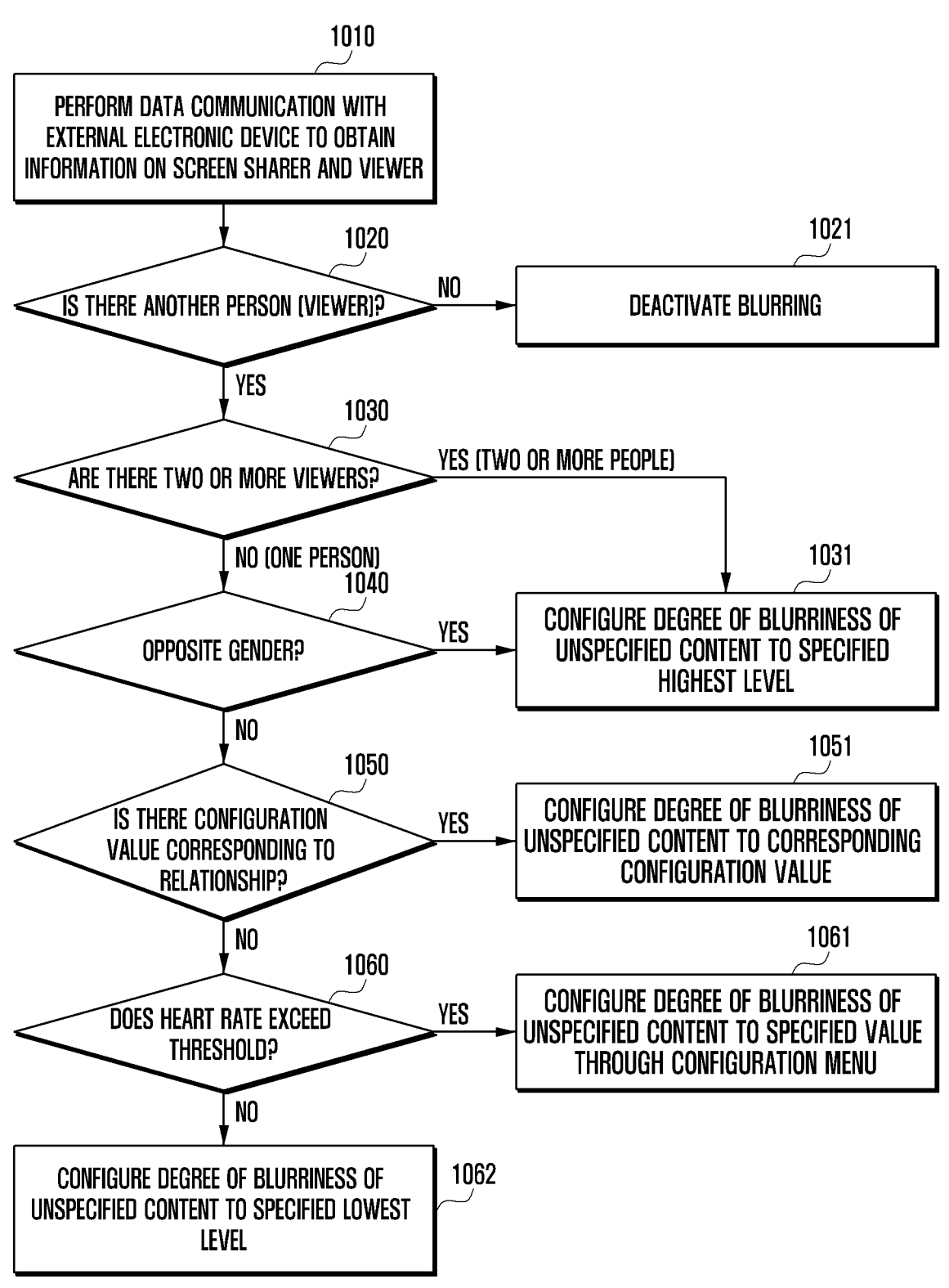
FIG. 10 is a flowchart illustrating operations for determining the degree of blurriness of unspecified content that may be sensitive to a user (a screen sharer) when sharing content with others (viewers) through screen mirroring according to an embodiment.

FIG. 10 is a flowchart illustrating operations for determining the degree of blurriness of unspecified content that may be sensitive to a user (a screen sharer) when sharing content with others (viewers) through screen mirroring according to an embodiment.

In operation 1010, the third processor 232 of the first portable electronic device 230 may perform data communication with an external electronic device to obtain information on a screen sharer and a viewer. The viewer information obtainable through data communication may include information indicating the number of viewers, the gender of the viewers, and the relationship between the screen sharer and the viewers. The screen sharer information obtainable through data communication may include a heart rate as biometric information of the screen sharer.

As an example, as described with reference to FIG. 3, the third processor 232 may obtain viewer information (e.g., the number of viewers, the gender of the viewers, and the relationship between the viewers and the screen sharer) by using user identification information received from other portable electronic devices and information indicating the human relationship of the screen sharer through a short-range wireless communication circuit (e.g., the first Bluetooth communication circuit 310 and/or the first Wi-Fi communication circuit 320).

As another example, as described with reference to FIG. 4, the third processor 232 may obtain location information of the first portable electronic device 230 through positioning communication (e.g., downlink TDoA or uplink TDoA) with anchors 410 using the first UWB communication circuit 430. The third processor 232 may obtain location information of each of the other portable electronic device(s) through the first Bluetooth communication circuit 310 or the first Wi-Fi communication circuit 320. The third processor 232 may recognize the number of viewers by using the obtained location information.

As another example, as described with reference to FIG. 4, the third processor 232 may obtain distance information through positioning communication (e.g., SS-TWR or DS-TWR) with other portable electronic devices using the first UWB communication circuit 430 and recognize the number of viewers by using the obtained distance information.

As another example, as described with reference to FIG. 5, the third processor 232 may receive distance information from the external display device 220 through the first Bluetooth communication circuit 310 or the first Wi-Fi communication circuit 320 and recognize the number of viewers by using the received distance information.

As another example, as described with reference to FIG. 6, the third processor 232 may receive image data from the external display device 220 through the first Bluetooth communication circuit 310 or the first Wi-Fi communication circuit 320, and obtain information indicating the number of viewers, the gender of the viewers, and the relationship between the viewers and the screen sharer by using the received image data.

The third processor 232 may receive a value indicating the heart rate as the user's biometric information from the wearable device (e.g., a smart watch) through the first Bluetooth communication circuit 310 or the first Wi-Fi communication circuit 320.

In operation 1020, the third processor 232 may identify whether there is another person (viewer) from the viewer information. If it is identified that there is no viewer, the third processor 232 may deactivate blurring in operation 1021. That is, the third processor 232 may transmit image data corresponding to unspecified content to the external display device 220 without blurring.

If it is identified that there is a viewer, the third processor 232 may identify whether there are two or more viewers from the viewer information in operation 1030. If it is identified that there are two or more viewers, the third processor 232 may configure the degree of blurriness of unspecified content to the specified highest level in operation 1031.

If it is identified that there is one viewer, the third processor 232 may identify in the viewer information whether the viewer is of a different gender from the screen sharer in operation 1040. If the viewer is of the opposite gender, the third processor 232 may configure the degree of blurriness of unspecified content to the specified highest level in operation 1031.

If the viewer is of the same gender, in operation 1050, the third processor 232 may identify the relationship between the two (the screen sharer, and the viewer) from the viewer information, and identify whether a configuration value corresponding to the identified relationship is stored in the third memory 233. As a result of identification, if the corresponding configuration value is in the third memory 233, the third processor 232 may configure the degree of blurriness of the unspecified content to the corresponding configuration value. For example, referring to FIG. 9 again, when the relationship between the two is identified as "friends", the third processor 232 may configure the degree of blurriness of unspecified content to the configuration value configured for the "friends" group through the pop-up window 925.

As a result of identification, if the corresponding group is not configured, in operation 1060, the third processor 232 may identify whether the heart rate of the screen sharer exceeds a specified threshold from the biometric information. If the heart rate exceeds a specified threshold, in operation 1061, the third processor 232 may configure the degree of blurriness of the unspecified content to a configuration value specified for unspecified content. For example, referring to FIG. 9 again, the third processor 232 may configure the degree of blurriness of unspecified content with a configuration value input through the third item 923.

If the heart rate is less than or equal to a specified threshold, in operation 1062, the third processor 232 may configure the degree of blurriness of unspecified content to the specified lowest level.

FIG. 11 is a flowchart illustrating operations for preventing content that may be sensitive to a user (a screen sharer) from being exposed to others (viewers) according to an embodiment.

In operation 1110, the third processor 232 of the first portable electronic device 230 may determine that another person (viewer) watching the display of the first external electronic device other than the user (screen sharer) is present in the vicinity of the first portable electronic device 230 through data communication with the first external electronic device or the second external electronic device in the state of being wirelessly connected to the first external electronic device (e.g., the external display device 220) for screen mirroring.

As an example, as described with reference to FIG. 3, the third processor 232 may determine that another person is present in the vicinity based on the identification information (e.g., information indicating the type of the device and/or identification information of the user who owns the device) received from the second external electronic device (e.g., the second portable electronic device 302) through a short-range wireless communication circuit (e.g., the first Bluetooth communication circuit 310 and/or the first Wi-Fi communication circuit 320).

As another example, as described with reference to FIG. 4, the third processor 232 may obtain first location information of the first portable electronic device 230 through positioning communication (e.g., downlink TDoA or uplink TDoA) with anchors 410 using the first UWB communication circuit 430. The third processor 232 may receive location information of the second external electronic device from the second external electronic device (e.g., the second portable electronic device 302) through the first Bluetooth communication circuit 310 or the first Wi-Fi communication circuit 320. The third processor 232 may determine that another person is present in the vicinity based on the first location information and the second location information.

As another example, as described with reference to FIG. 4, the third processor 232 may obtain distance information through positioning communication (e.g., SS-TWR or DS-TWR) with a second external electronic device (e.g., the second portable electronic device 302) using the first UWB communication circuit 430, and determine that another person is present in the vicinity based on the obtained distance information.

As another example, as described with reference to FIG. 5, the third processor 232 may receive distance information from the first external electronic device (e.g., an external display device 220) through the first Bluetooth communication circuit 310 or the first Wi-Fi communication circuit 320, and determine that another person is present in the vicinity based on the received distance information.

As another example, as described with reference to FIG. 6, the third processor 232 may receive image data from the first external electronic device (e.g., an external display device 220) through the first Bluetooth communication circuit 310 or the first Wi-Fi communication circuit 320, and determine that another person is present in the vicinity based on the received image data.

In operation 1120, the third processor 232 may blur image data corresponding to unspecified content to be displayed on the internal display 234, based on determination that another person is present in the vicinity. When blurring, the third processor 232 may determine the degree of blurriness of unspecified content based on viewer information (e.g., the number of viewers, the gender of the viewers, or the relationship between the user and others) obtained through data communication with an external electronic device (e.g., the external display device 220 or the second portable device 302). Here, the determination of the degree of blurriness may be implemented by the embodiment of FIG. 9.

In operation 1130, the third processor 232 may display unspecified content on the internal display 234 and transmit the blurred image data to a first external electronic device (e.g., the external display device 220) through a short-range wireless communication circuit (e.g., the first Bluetooth communication circuit 310 or the first Wi-Fi communication circuit 320). The first external electronic device may convert the received blurred image data into visual information (i.e., blurred unspecified content) and display the same on the display.

According to an embodiment, a portable electronic device (e.g., the first portable electronic device 230) may include a wireless communication circuit (e.g., the third communication circuit 231) comprising processing circuitry; a display (e.g., the internal display 234); at least one processor (e.g., the third processor 232) connected to the wireless communication circuit and the display; and memory (e.g., the third memory 233) comprising one or more storage media storing instructions. The instructions, when executed by the at least one processor individually or collectively, may cause the portable electronic device to connect to a first external electronic device through the wireless communication circuit. The instructions, when executed by the at least one processor individually or collectively, may cause the portable electronic device to determine that there is a viewer, other than a user of the portable electronic device, watching a display of the first external electronic device in the vicinity of the portable electronic device through data communication with the first external electronic device or a second external electronic device using the wireless communication circuit. The instructions, when executed by the at least one processor individually or collectively, may cause the portable electronic device to blur image data corresponding to unspecified content not specified as a target for sharing with the viewer based on the determination that there is the viewer in the vicinity of the portable electronic device. The instructions, when executed by the at least one processor individually or collectively, may cause the portable electronic device to display the unspecified content on the display of the portable electronic device, and transmit the blurred image data to the first external electronic device through the wireless communication circuit.

The instructions, when executed by the at least one processor individually or collectively, may cause the portable electronic device to display a user interface for adjusting the degree of blurriness of the unspecified content on the display together with the unspecified content.

The instructions, when executed by the at least one processor individually or collectively, may cause the portable electronic device to identify relationship information indicating a social relationship for a user of the portable electronic device in the memory. The instructions, when executed by the at least one processor individually or collectively, may cause the portable electronic device to obtain viewer information based on the information indicating the social relationship and the user identification information received from the second external electronic device. The instructions, when executed by the at least one processor individually or collectively, may cause the portable electronic device to determine the degree of blurriness of the unspecified content based on the viewer information. The obtained viewer information may include the number of the viewers, the gender of each of the viewers, and information indicating the relationship between the user and the viewer.

The instructions, when executed by the at least one processor individually or collectively, may cause the portable electronic device to configure the degree of blurriness of the unspecified content to the specified highest level based on the number of viewers identified in the viewer information being two or more.

The instructions, when executed by the at least one processor individually or collectively, may cause the portable electronic device to configure the degree of blurriness of the unspecified content to the specified highest level based on the fact that the number of the viewers is one and the viewer is identified in the viewer information to be of a different gender from the user.

The instructions, when executed by the at least one processor individually or collectively, may cause the portable electronic device to provide a first configuration menu for configuring the degree of blurriness of the unspecified content in response to the relationship between the user and the viewer through the display. The instructions, when executed by the at least one processor individually or collectively, may cause the portable electronic device to identify a first configuration value specified for the relationship through the first configuration menu (e.g., the pop-up window 925) in the memory based on the fact that the number of the viewers is one, and the viewer is of the same gender as the user. The instructions, when executed by the at least one processor individually or collectively, may cause the portable electronic device to configure the degree of blurriness of the unspecified content based on the first configuration value.

The instructions, when executed by the at least one processor individually or collectively, may cause the portable electronic device to obtain a heart rate, which is biometric information of the user. The instructions, when executed by the at least one processor individually or collectively, may cause the portable electronic device to configure the degree of blurriness of the unspecified content to the specified lowest level based on the fact that the number of the viewers is one, the viewer is of the same gender as the user, the first configuration value specified in the relationship is not stored in the memory, and the heart rate is below the specified threshold.

The instructions, when executed by the at least one processor individually or collectively, may cause the portable electronic device to provide a second configuration menu (e.g., the third item 923) for configuring the degree of blurriness of the unspecified content through the display. The instructions, when executed by the at least one processor individually or collectively, may cause the portable electronic device to identify a second configuration value specified for the unspecified content in the memory through the second configuration menu based on the fact that the number of the viewers is one, the viewer is of the same gender as the user, the first configuration value corresponding to the relationship is not identified in the memory, and the heart rate exceeds the threshold. The instructions, when executed by the at least one processor individually or collectively, may cause the portable electronic device to configure the degree of blurriness of the unspecified content based on the second configuration value.

The instructions, when executed by the at least one processor individually or collectively, may cause the portable electronic device to identify relationship information indicating a social relationship for a user of the portable electronic device in the memory. The instructions, when executed by the at least one processor individually or collectively, may cause the portable electronic device to obtain viewer information based on the information indicating the social relationship and image data received from the first external electronic device. The instructions, when executed by the at least one processor individually or collectively, may cause the portable electronic device to determine the degree of blurriness of the unspecified content based on the viewer information. The obtained viewer information may include the number of the viewers, the gender of each of the viewers, and information indicating the relationship between the user and the viewer.

A wireless communication circuit may include a Bluetooth communication circuit (e.g., the first Bluetooth communication circuit 310) and a Wi-Fi communication circuit (e.g., the first Wi-Fi communication circuit 320). The instructions, when executed by the at least one processor individually or collectively, may cause the portable electronic device to determine that there is the viewer in the vicinity of the portable electronic device based on the identification information received from the second external electronic device through the Bluetooth communication circuit or the Wi-Fi communication circuit.

A wireless communication circuit may include a UWB communication circuit (e.g., the first UWB communication circuit 430), a Bluetooth communication circuit (e.g., the first Bluetooth communication circuit 310), and a Wi-Fi communication circuit (e.g., the first Wi-Fi communication circuit 320). The instructions, when executed by the at least one processor individually or collectively, may cause the portable electronic device to obtain first location information of the portable electronic device by performing positioning communication with anchors by using the UWB communication circuit. The instructions, when executed by the at least one processor individually or collectively, may cause the portable electronic device to receive second location information of the second external electronic device from the second external electronic device through the Bluetooth communication circuit or the Wi-Fi communication circuit. The instructions, when executed by the at least one processor individually or collectively, may cause the portable electronic device to determine that there is the viewer in the vicinity of the portable electronic device based on the first location information and the second location information.

A wireless communication circuit may include a UWB communication circuit (e.g., the first UWB communication circuit 430). The instructions, when executed by the at least one processor individually or collectively, may cause the portable electronic device to obtain distance information by performing positioning communication with the second external electronic device by using the UWB communication circuit. The instructions, when executed by the at least one processor individually or collectively, may cause the portable electronic device to determine that there is the viewer in the vicinity of the portable electronic device based on the distance information.

The instructions, when executed by the at least one processor individually or collectively, may cause the portable electronic device to receive distance information from the first external electronic device. The instructions, when executed by the at least one processor individually or collectively, may cause the portable electronic device to determine that there is the viewer in the vicinity of the portable electronic device based on the distance information.

The instructions, when executed by the at least one processor individually or collectively, may cause the portable electronic device to receive image data from the first external electronic device. The instructions, when executed by the at least one processor individually or collectively, may cause the portable electronic device to determine that there is the viewer in the vicinity of the portable electronic device based on the image data received from the first external electronic device.

According to an embodiment, a method of operating a portable electronic device (e.g., the first portable electronic device 230) may include connecting to a first external electronic device through the wireless communication circuit of the portable electronic device. The method may include determining that there is a viewer, other than a user of the portable electronic device, watching a display of the first external electronic device in the vicinity of the portable electronic device through data communication with the first external electronic device or a second external electronic device using the wireless communication circuit. The method may include blurring image data corresponding to unspecified content not specified as a target for sharing with the viewer based on the determination that there is the viewer in the vicinity of the portable electronic device. The method may include displaying the unspecified content on the display of the portable electronic device, and transmitting the blurred image data to the first external electronic device through the wireless communication circuit.

According to various embodiments, an electronic device may prevent content that may be sensitive to the user from being exposed to others while screen mirroring is performed. In addition, various effects that may be directly or indirectly identified through the disclosure may be provided.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A portable electronic device comprising:
a wireless communication circuit;
a display;
memory comprising one or more storage media storing instructions; and
at least one processor comprising processing circuitry,
wherein the instructions, when executed by the at least one processor individually or collectively, cause the portable electronic device to:
receive a first message through the wireless communication circuit while the portable electronic device is performing communication with a first external electronic device through the wireless communication circuit;
determine whether a viewer, other than a user of the portable electronic device, exists around the portable electronic device based on data being received from the first external electronic device or a second external electronic device, wherein the data includes at least one of information indicating a type of device or information indicating ownership of the device;
based on determining that the viewer exists around the portable electronic device, determine whether a first content, corresponding to a preset content not to be shared, is included in the first message;
based on determining that the first content is included in the first message, generate a second message having a second content generated by blurring the first content; and
display the first message on the display and transmit the second message to the first external electronic device through the wireless communication circuit.

2. The portable electronic device of claim 1, wherein the instructions, when executed by the at least one processor individually or collectively, cause the portable electronic device to display a user interface for adjusting a degree of blurriness of the first content on the display of the portable electronic device with the first content.

3. The portable electronic device of claim 1, the instructions, when executed by the at least one processor individually or collectively, cause the portable electronic device to:
identify relationship information about a social relationship of the user of the portable electronic device in the memory;

obtain viewer information based on the information about the social relationship and user identification information received from the second external electronic device; and
determine a degree of blurriness of the first content based on the viewer information, and
wherein the obtained viewer information comprises:
a number of viewers;
a gender of the viewers; and
information about a relationship between the user and the viewers.

4. The portable electronic device of claim 3, wherein the instructions, when executed by the at least one processor individually or collectively, cause the portable electronic device to configure the degree of blurriness of the first content to a highest level based on the number of viewers being two or more according to the viewer information.

5. The portable electronic device of claim 4, wherein the instructions, when executed by the at least one processor individually or collectively, cause the portable electronic device to configure the degree of blurriness of the first content to the highest level based on the number of viewers being one and a gender of the viewer being different than a gender of the user according to the viewer information.

6. The portable electronic device of claim 5, wherein the instructions, when executed by the at least one processor individually or collectively, cause the portable electronic device to:
provide a first configuration menu for configuring the degree of blurriness of the first content based on the relationship between the user and the viewers through the display of the portable electronic device;
identify whether a first configuration value corresponding to the relationship through the first configuration menu is stored in the memory based on the number of viewers being one, and the gender of the viewer corresponding to the gender of the user; and
based on the first configuration value being stored in the memory, configure the degree of blurriness of the first content based on the first configuration value.

7. The portable electronic device of claim 6, wherein the instructions, when executed by the at least one processor individually or collectively, cause the portable electronic device to:
obtain a heart rate as biometric information of the user; and
configure the degree of blurriness of the first content to a lowest level based on the number of viewers being one, the gender of the viewer corresponding to the gender of the user, the first configuration value corresponding to the relationship not being stored in the memory, and the heart rate being below a threshold.

8. The portable electronic device of claim 7, wherein the instructions, when executed by the at least one processor individually or collectively, cause the portable electronic device to:
provide a second configuration menu for configuring the degree of blurriness of the first content through the display of the portable electronic device;
identify whether a second configuration value specified for the first content is stored in the memory through the second configuration menu based on the number of viewers being one, the gender of the viewer corresponding to the gender of the user, the first configuration value corresponding to the relationship not being stored in the memory, and the heart rate exceeding the threshold; and based on the second configuration value being stored in the memory, configure the degree of blurriness of the first content based on the second configuration value.

9. The portable electronic device of claim 1, wherein the instructions, when executed by the at least one processor individually or collectively, cause the portable electronic device to:

identify relationship information about a social relationship of the user of the portable electronic device in the memory;

obtain viewer information based on the information about the social relationship and image data received from the first external electronic device; and determine a degree of blurriness of the first content based on the viewer information, and wherein the obtained viewer information comprises:

a number of viewers;

a gender of the viewers; and information about a relationship between the user and the viewers.

10. The portable electronic device of claim 1, wherein the wireless communication circuit comprises a Bluetooth communication circuit and a Wi-Fi communication circuit, and wherein the instructions, when executed by the at least one processor individually or collectively, cause the portable electronic device to determine that the viewer exists around the portable electronic device based on identification information received from the second external electronic device through the Bluetooth communication circuit or the Wi-Fi communication circuit.

11. The portable electronic device of claim 1, wherein the wireless communication circuit comprises an ultra-wideband (UWB) communication circuit, a Bluetooth communication circuit, and a Wi-Fi communication circuit, and wherein the instructions, when executed by the at least one processor individually or collectively, cause the portable electronic device to:

obtain first location information of the portable electronic device based on a positioning communication with anchors through the UWB communication circuit;

receive second location information of the second external electronic device from the second external electronic device through the Bluetooth communication circuit or the Wi-Fi communication circuit; and determine that the viewer exists around the portable electronic device based on the first location information and the second location information.

12. The portable electronic device of claim 1, wherein the wireless communication circuit comprises an ultra-wideband (UWB) communication circuit, and wherein the instructions, when executed by the at least one processor individually or collectively, cause the portable electronic device to:

obtain distance information based on a positioning communication with the second external electronic device through the UWB communication circuit; and determine that the viewer exists around the portable electronic device based on the distance information.

13. The portable electronic device of claim 1, wherein the instructions, when executed by the at least one processor individually or collectively, cause the portable electronic device to:

receive distance information from the first external electronic device; and determine that the viewer exists around the portable electronic device based on the distance information.

14. The portable electronic device of claim 1, wherein the instructions, when executed by the at least one processor individually or collectively, cause the portable electronic device to:

receive image data from the first external electronic device; and determine that the viewer exists around the portable electronic device based on the image data received from the first external electronic device.

15. A method of operating a portable electronic device, the method comprising:

receiving a first message through a wireless communication circuit of the portable electronic device while the portable electronic device is performing communication with a first external electronic device through the wireless communication circuit of the portable electronic device;

determining a viewer, other than a user of the portable electronic device, exists around the portable electronic device based on data being received from the first external electronic device or a second external electronic device, wherein the data includes at least one of information indicating a type of device or information indicating ownership of the device;

based on determining that the viewer exists around the portable electronic device, determining whether a first content, corresponding to a preset content not to be shared, is included in the first message;

based on determining that the first content is included in the first message, generating a second message having a second content generated by blurring the first content; and displaying the first message on a display of the portable electronic device and transmitting the second message to the first external electronic device through the wireless communication circuit.

* * * * *